(12) United States Patent
Kuhara

(10) Patent No.: US 10,974,615 B2
(45) Date of Patent: Apr. 13, 2021

(54) UNMANNED FLYING OBJECT, FLIGHT CONTROL METHOD, AND RECORDING MEDIUM STORING PROGRAM

(71) Applicant: Panasonic Intellectual Property Corporation of America, Torrance, CA (US)

(72) Inventor: Shunsuke Kuhara, Osaka (JP)

(73) Assignee: PANASONIC INTELLECTUAL PROPERTY CORPORATION OF AMERICA, Torrance, CA (US)

(*) Notice: Subject to any disclaimer, the term of this patent is extended or adjusted under 35 U.S.C. 154(b) by 506 days.

(21) Appl. No.: 15/730,894

(22) Filed: Oct. 12, 2017

(65) Prior Publication Data

US 2019/0025828 A1 Jan. 24, 2019

Related U.S. Application Data

(63) Continuation of application No. PCT/JP2016/003144, filed on Jun. 30, 2016.
(Continued)

(30) Foreign Application Priority Data

Oct. 27, 2015 (JP) .............................. JP2015-210332
Jun. 22, 2016 (JP) .............................. JP2016-123244

(51) Int. Cl.
*G05D 1/10* (2006.01)
*H02J 7/00* (2006.01)
(Continued)

(52) U.S. Cl.
CPC ............ *B60L 58/12* (2019.02); *B64C 39/024* (2013.01); *B64D 31/06* (2013.01); *G05D 1/0088* (2013.01);
(Continued)

(58) Field of Classification Search
CPC combination set(s) only.
See application file for complete search history.

(56) References Cited

U.S. PATENT DOCUMENTS 9,376,208 B1 * 6/2016 Gentry .................... G08G 5/006
9,841,761 B2 * 12/2017 Shehata ............... G08G 5/0069
(Continued)

FOREIGN PATENT DOCUMENTS

CN 104166355 A 11/2014
JP 2013-241177 12/2013

OTHER PUBLICATIONS

International Search Report of PCT application No. PCT/JP2016/003144 dated Aug. 9, 2016.
(Continued)

*Primary Examiner* — Adam D Tissot
*Assistant Examiner* — Laura E Linhardt
(74) *Attorney, Agent, or Firm* — Greenblum & Bernstein, P.L.C.

(57) ABSTRACT

An unmanned flying object includes a battery remaining quantity acquirer that acquires a remaining quantity of a battery; an arrival decider that, when the unmanned flying object starts traveling from a first point at which the unmanned flying object is currently located to a second point through which the unmanned flying object passes next to the first point, decides whether the unmanned flying object can arrive at the second point, on the basis of an end time of a time zone in which the unmanned flying object is permitted to fly and the remaining quantity of the battery; and a flight controller that, if it is decided that the unmanned flying object can arrive at the second point, causes the unmanned flying object to depart for the second point.

17 Claims, 14 Drawing Sheets

Related U.S. Application Data

(60) Provisional application No. 62/193,670, filed on Jul. 17, 2015.

(51) Int. Cl.
| | | |
|---|---|---|
| *B64C 39/02* | (2006.01) | |
| *G08G 5/00* | (2006.01) | |
| *G08C 17/00* | (2006.01) | |
| *B60L 58/12* | (2019.01) | |
| *G05D 1/00* | (2006.01) | |
| *B64D 31/06* | (2006.01) | |
| *G06Q 10/04* | (2012.01) | |

(52) U.S. Cl.
CPC ..... *B60L 2200/10* (2013.01); *B60L 2240/547* (2013.01); *B60L 2240/62* (2013.01); *B60L 2240/622* (2013.01); *B60L 2240/80* (2013.01); *B60L 2250/00* (2013.01); *B60L 2250/16* (2013.01); *B60L 2260/32* (2013.01); *B60L 2260/52* (2013.01); *B60L 2260/58* (2013.01); *B64C 2201/042* (2013.01); *B64C 2201/141* (2013.01); *G06Q 10/047* (2013.01)

(56) References Cited

U.S. PATENT DOCUMENTS

| | | | | |
|---|---|---|---|---|
| 9,944,191 | B2* | 4/2018 | Kim | B64C 39/024 |
| 9,950,814 | B1* | 4/2018 | Beckman | B61L 25/025 |
| 2014/0129059 | A1 | 5/2014 | Scarlatti et al. | |
| 2015/0142211 | A1 | 5/2015 | Shehata et al. | |
| 2016/0216711 | A1* | 7/2016 | Srivastava | G08G 5/045 |
| 2017/0225802 | A1* | 8/2017 | Lussier | B64C 39/024 |

OTHER PUBLICATIONS

English Translation of Chinese Search Report dated Apr. 16, 2020 for the related Chinese Patent Application No. 201680015742.9.

\* cited by examiner

UNMANNED FLYING OBJECT, FLIGHT CONTROL METHOD, AND RECORDING MEDIUM STORING PROGRAM

BACKGROUND

1. Technical Field

The present disclosure relates to an unmanned flying object that autonomously flies, a flight control method of controlling the autonomous flight of the unmanned flying object, and a recording medium storing a program of controlling the autonomous flight of the unmanned flying object.

2. Description of the Related Art

In recent years, a small unmanned flying object that autonomously flies on a predetermined flight route is being developed. The unmanned flying object includes a plurality of propellers. By controlling the respective rotation speeds of the plurality of propellers, the unmanned flying object can freely fly in the air and autonomously flies on a predetermined flight route.

When the unmanned flying object cannot reach a destination by one-time flight, the unmanned flying object travels to the destination via a plurality of points. For example, when the remaining quantity of a battery included in the unmanned flying object becomes none, the unmanned flying object can no longer fly. Hence, the unmanned flying object is required to be charged at a predetermined point when the unmanned flying object travels for a long distance.

For example, Japanese Unexamined Patent Application Publication No. 2013-241177 discloses a method including a step of detecting that an energy storage device on an unmanned aerial vehicle is depleted below a threshold level; a step of operating the unmanned aerial vehicle so as to land on a base station; and a step of at least starting operation of the base station to cause a replacement mechanism of the base station to remove the energy storage device on the unmanned aerial vehicle from the unmanned aerial vehicle, and to replace the removed device with another energy storage device.

However, the technology of related art is required to be further improved.

SUMMARY

In one general aspect, the techniques disclosed here feature an unmanned flying object including a controller; and a battery that supplies the unmanned flying object with electric power. The controller performs operations including acquiring a remaining quantity of the battery; when the unmanned flying object starts traveling from a first point at which the unmanned flying object is currently located to a second point through which the unmanned flying object passes next to the first point, deciding whether the unmanned flying object can arrive at the second point, on the basis of an end time of a time zone in which the unmanned flying object is permitted to fly and the remaining quantity of the battery, the first point and the second point being included in a plurality of points previously determined as candidates for way points; and if it is decided that the unmanned flying object can arrive at the second point, causing the unmanned flying object to depart for the second point.

With the aspect of the present disclosure, the unmanned flying object is caused to depart for the second point if the unmanned flying object can arrive at the second point by the end time of the time zone in which the unmanned flying object is permitted to fly. Accordingly, the unmanned flying object can be prevented from flying after the end time of the time zone in which the unmanned flying object is permitted to fly.

It should be noted that general or specific embodiments may be implemented as an apparatus, a system, a method, an integrated circuit, a computer program, a computer-readable storage medium, such as a CD-ROM, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
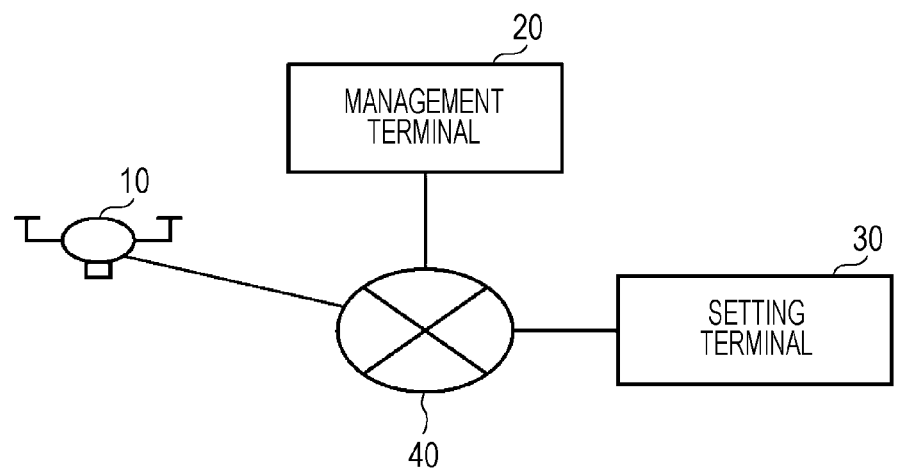
FIG. 1 illustrates a configuration of a flight control system according to a first embodiment of the present disclosure.

Underlying Knowledge Forming Basis of the Present Disclosure

As described above, since unmanned flying objects can fly in the air, regulations relating to flight of various unmanned flying objects are being considered. For example, a regulation of inhibiting flight of an unmanned flying object during the nighttime and permitting flight of the unmanned flying object during the daytime is being considered.

The related art discloses that the unmanned aerial vehicle of related art is operated so as to land on the base station when it is detected that the energy storage device on the unmanned aerial vehicle is depleted below the threshold level; however, does not disclose that the unmanned aerial vehicle is operated so as to autonomously travel only during a time zone in which the unmanned aerial vehicle is permitted to travel.

Based on the above-described consideration, the inventor has conceived respective aspects of the present disclosure.

According to an aspect of the present disclosure, an unmanned flying object includes a controller; and a battery that supplies the unmanned flying object with electric power. The controller performs operations including acquiring a remaining quantity of the battery; when the unmanned flying object starts traveling from a first point at which the unmanned flying object is currently located to a second point through which the unmanned flying object passes next to the first point, deciding whether the unmanned flying object can arrive at the second point, on the basis of an end time of a time zone in which the unmanned flying object is permitted to fly and the remaining quantity of the battery, the first point and the second point being included in a plurality of points previously determined as candidates for way points; and if it is decided that the unmanned flying object can arrive at the second point, causing the unmanned flying object to depart for the second point.

With this configuration, the remaining quantity of the battery that feeds electric power is acquired. When the unmanned flying object starts traveling from the first point at which the unmanned flying object is currently located to the second point through which the unmanned flying object passes next to the first point, it is decided whether the unmanned flying object can arrive at the second point, on the basis of the end time of the time zone in which the unmanned flying object is permitted to fly and the remaining quantity of the battery. If it is decided that the unmanned flying object can arrive at the second point, the unmanned flying object is caused to depart for the second point.

The unmanned flying object is caused to depart for the second point if the unmanned flying object can arrive at the second point by the end time of the time zone in which the unmanned flying object is permitted to fly. Accordingly, the unmanned flying object can be prevented from flying after the end time of the time zone in which the unmanned flying object is permitted to fly.

Also, in the unmanned flying object, a charging device that charges the battery is disposed at the first point, and the operations further include calculating a travel possible distance by which the unmanned flying object can travel from the first point, on the basis of the remaining quantity of the battery; and if it is decided that the travel possible distance is not equal to or larger than a travel distance between the first point and the second point, causing the charging device to start charging the battery.

With this configuration, the charging device that charges the battery is disposed at the first point. The travel possible distance by which the unmanned flying object can travel from the first point is calculated on the basis of the remaining quantity of the battery. If it is decided that the travel possible distance is not equal to or larger than the travel distance between the first point and the second point, the charging device is caused to start charging the battery. Accordingly, the battery can be charged to allow the unmanned flying object to arrive at the second point.

Also, in the unmanned flying object, the operations further include acquiring the remaining quantity of the battery while the unmanned flying object is connected to the charging device; calculating a travel possible distance by which the unmanned flying object can travel from the first point, on the basis of the remaining quantity of the battery acquired while the unmanned flying object is connected to the charging device; and if it is decided that the calculated travel possible distance is equal to or larger than the travel distance, deciding whether a calculated expected arrival time is after the end time.

With this configuration, the remaining quantity of the battery is acquired while the unmanned flying object is connected to the charging device. The travel possible distance by which the unmanned flying object can travel from the first point is calculated on the basis of the remaining quantity of the battery acquired while the unmanned flying object is connected to the charging device. If it is decided that the calculated travel possible distance is equal to or larger than the travel distance, it is decided whether the calculated expected arrival time is after the end time.

Accordingly, the unmanned flying object can be caused to depart for the second point at the time when the remaining quantity of the battery becomes the quantity by which the unmanned flying object can arrive at the second point.

Also, the unmanned flying object further includes a storage that stores charge availability information indicative of whether a charging device is present at each of the plurality of points. In the unmanned flying object, the operations further include calculating a travel possible distance by which the unmanned flying object can travel from the first point, on the basis of the remaining quantity of the battery; if it is decided that the travel possible distance is not a travel distance between the first point and the second point, referencing the charge availability information, and deciding whether the charging device is present at the first point; and if it is decided that the charging device is not present at the first point, referencing the charge availability information, specifying a point which is within a range of the travel possible distance, which is within a predetermined range from the first point, and at which the charging device is present, and causing the unmanned flying object to depart for the specified point.

With this configuration, the storage stores the charge availability information indicative of whether the charging device is present at each of the plurality of points. The travel possible distance by which the unmanned flying object can travel from the first point is calculated on the basis of the remaining quantity of the battery. If it is decided that the travel possible distance is not the travel distance between the first point and the second point, the charge availability information is referenced, and it is decided whether the charging device is present at the first point. If it is decided that the charging device is not present at the first point, the charge availability information is referenced, the point which is within the range of the travel possible distance, which is within the predetermined range from the first point, and at which the charging device is present is specified, and the unmanned flying object is caused to depart for the specified point.

Accordingly, the battery can be charged while the unmanned flying object is caused to wait, and the unmanned flying object can be caused to fly immediately when the time becomes the expected departure time.

Also, in the unmanned flying object, the operations further include, if it is decided that the unmanned flying object cannot arrive at the second point, determining a start time of a next time zone in which the unmanned flying object is permitted to fly, as an expected departure time at which the unmanned flying object is caused to depart for the second point.

With this configuration, if it is decided that the unmanned flying object cannot arrive at the second point, the start time of the next time zone in which the unmanned flying object is permitted to fly is determined as the expected departure time at which the unmanned flying object is caused to depart for the second point.

The unmanned flying object can be caused to wait from the end time of the time zone in which the unmanned flying object is permitted to fly at the start time of the next time zone in which the unmanned flying object is permitted to fly. Accordingly, the unmanned flying object can be prevented from flying after the end time of the time zone in which the unmanned flying object is permitted to fly.

Also, the unmanned flying object includes a plurality of unmanned flying objects, the plurality of unmanned flying objects is present at the first point, and the plurality of unmanned flying objects has respective different expected departure times.

With this configuration, the plurality of unmanned flying objects present at the first point has the respective different expected departure times. Accordingly, the plurality of unmanned flying objects present at the first point can be prevented from simultaneously departing.

Also, in the unmanned flying object, the operations further include, if it is decided that the unmanned flying object cannot arrive at the second point, notifying a management terminal that is used by a manager who manages the unmanned flying object, about that the unmanned flying object is caused to wait at the first point.

With this configuration, if it is decided that the unmanned flying object cannot arrive at the second point, the management terminal that is used by the manager who manages the unmanned flying object is notified about that the unmanned flying object is caused to wait at the first point. Accordingly, the management terminal can recognize that the unmanned flying object waits at the first point.

Also, in the unmanned flying object, the operations further include, if it is decided that the unmanned flying object cannot arrive at the second point, determining a point at which the unmanned flying object can arrive by the end time, which is within a predetermined range from the second point, and which is the closest to the second point, as a third point through which the unmanned flying object newly passes; and causing the unmanned flying object to depart for the determined third point.

With this configuration, if it is decided that the unmanned flying object cannot arrive at the second point, the point at which the unmanned flying object can arrive by the end time, which is within the predetermined range from the second point, and which is the closest to the second point is determined as the third point through which the unmanned flying object newly passes. Then, the unmanned flying object is caused to depart for the determined third point.

Even if it is decided that the unmanned flying object cannot arrive at the second point, the unmanned flying object can be caused to travel to the point which is within the predetermined range from the second point, and which is the closest to the second point. Accordingly, the unmanned flying object can be caused to arrive at the destination earlier.

Also, the unmanned flying object further includes a position measurer that acquires a current position of the unmanned flying object, and the operations further include deciding whether the unmanned flying object can arrive at the second point during flight from the first point to the second point, on the basis of the current position acquired by the position measurer, the end time of the time zone in which the unmanned flying object is permitted to fly, and the remaining quantity of the battery; and if it is decided that the unmanned flying object cannot arrive at the second point, causing the unmanned flying object to travel to a fourth point at which the unmanned flying object can arrive by the end time, which is within a predetermined range from the second point, and which is the closest to the second point among the plurality of points.

With this configuration, it is decided whether the unmanned flying object can arrive at the second point during flight from the first point to the second point, on the basis of the current position acquired by the position measurer, the end time of the time zone in which the unmanned flying object is permitted to fly, and the remaining quantity of the battery. If it is decided that the unmanned flying object cannot arrive at the second point, the unmanned flying object is caused to travel to the fourth point at which the unmanned flying object can arrive by the end time, which is within the predetermined range from the second point, and which is the closest to the second point among the plurality of points.

Accordingly, it can be decided whether the unmanned flying object can arrive at the second point during flight from the first point to the second point. Even if the expected arrival time at the second point is changed by the weather or deterioration over time of the battery, the unmanned flying object can be prevented from flying after the end time of the time zone in which the unmanned flying object is permitted to fly.

Also, in the unmanned flying object, the operations further include, if it is previously determined that the unmanned flying object travels to a fifth point among the plurality of points next to the second point, and if the unmanned flying object lands on the fourth point, deciding whether the second point is a point through which the unmanned flying object has to pass; if it is decided that the second point is the point through which the unmanned flying object has to pass, causing the unmanned flying object to depart for the second point from the fourth point; and if it is decided that the second point is a point through which the unmanned flying object does not have to pass, causing the unmanned flying object to depart for the fifth point from the fourth point.

With this configuration, if it is previously determined that the unmanned flying object travels to the fifth point among the plurality of points next to the second point, and if the unmanned flying object lands on the fourth point, it is decided whether the second point is the point through which the unmanned flying object has to pass. If it is decided that the second point is the point through which the unmanned flying object has to pass, the unmanned flying object is caused to depart for the second point from the fourth point. If it is decided that the second point is the point through which the unmanned flying object does not have to pass, the unmanned flying object is caused to depart for the fifth point from the fourth point.

If the travel target is changed from the second point to the fourth point during flight from the first point to the second point, the unmanned flying object can travel to the fifth point without passing through the second point depending on whether the second point is the point through which the unmanned flying object has to pass. Accordingly, the travel time of the unmanned flying object can be decreased.

According to another aspect of the present disclosure, a method of controlling autonomous flight of an unmanned flying object includes acquiring a remaining quantity of a battery that supplies the unmanned flying object with electric power; when the unmanned flying object starts traveling from a first point at which the unmanned flying object is currently located to a second point through which the unmanned flying object passes next to the first point, deciding whether the unmanned flying object can arrive at the second point, on the basis of an end time of a time zone in which the unmanned flying object is permitted to fly and the remaining quantity of the battery; and if it is decided that the unmanned flying object can arrive at the second point, causing the unmanned flying object to depart for the second point.

With this configuration, the remaining quantity of the battery that feeds electric power is acquired. When the unmanned flying object starts traveling from the first point at which the unmanned flying object is currently located to the second point through which the unmanned flying object passes next to the first point, it is decided whether the unmanned flying object can arrive at the second point, on the basis of the end time of the time zone in which the unmanned flying object is permitted to fly and the remaining quantity of the battery. If it is decided that the unmanned flying object can arrive at the second point, the unmanned flying object is caused to depart for the second point.

The unmanned flying object is caused to depart for the second point if the unmanned flying object can arrive at the second point by the end time of the time zone in which the unmanned flying object is permitted to fly. Accordingly, the unmanned flying object can be prevented from flying after the end time of the time zone in which the unmanned flying object is permitted to fly.

According to still another aspect of the present disclosure, there is provided a non-transitory computer-readable recording medium storing a program of controlling autonomous flight of an unmanned flying object. When the program is executed by a computer, the program causes the computer to perform operations including acquiring a remaining quantity of a battery that supplies the unmanned flying object with electric power; when the unmanned flying object starts traveling from a first point at which the unmanned flying object is currently located to a second point through which the unmanned flying object passes next to the first point, deciding whether the unmanned flying object can arrive at the second point, on the basis of an end time of a time zone in which the unmanned flying object is permitted to fly and the remaining quantity of the battery; and if it is decided that the unmanned flying object can arrive at the second point, causing the unmanned flying object to depart for the second point.

With this configuration, the remaining quantity of the battery that feeds electric power is acquired. When the unmanned flying object starts traveling from the first point at which the unmanned flying object is currently located to the second point through which the unmanned flying object passes next to the first point, it is decided whether the unmanned flying object can arrive at the second point, on the basis of the end time of the time zone in which the unmanned flying object is permitted to fly and the remaining quantity of the battery. If it is decided that the unmanned flying object can arrive at the second point, the unmanned flying object is caused to depart for the second point.

The unmanned flying object is caused to depart for the second point if the unmanned flying object can arrive at the second point by the end time of the time zone in which the unmanned flying object is permitted to fly. Accordingly, the unmanned flying object can be prevented from flying after the end time of the time zone in which the unmanned flying object is permitted to fly.

Embodiments of the present disclosure will be described below with reference to the drawings. The following embodiments are merely specific examples of the present disclosure, and do not limit the technical scope of the present disclosure.

First Embodiment

FIG. 1 illustrates a configuration of a flight control system according to a first embodiment of the present disclosure. The flight control system illustrated in FIG. 1 includes an unmanned flying object 10, a management terminal 20, and a setting terminal 30.

The unmanned flying object 10 autonomously flies via some of a plurality of predetermined points. The unmanned flying object 10 includes a plurality of propellers. By controlling the respective rotation speeds of the plurality of propellers, the unmanned flying object 10 travels forward, rearward, leftward, rightward, upward, and downward. The unmanned flying object 10 autonomously flies via some of a plurality of predetermined points while acquiring the current position thereof using global positioning system (GPS). The unmanned flying object 10 is communicatively connected to the management terminal 20 through a network 40. The unmanned flying object 10 is also communicatively connected to the setting terminal 30 through the network 40.

The management terminal 20 is a terminal that is used by a manager who manages the unmanned flying object 10. The management terminal 20 is, for example, a smartphone, a tablet computer, a desktop personal computer, or a common personal computer. The management terminal 20 receives, for example, arrival information, charge standby information, or departure standby information that is transmitted by the unmanned flying object 10. The arrival information is information for notification about that the unmanned flying object 10 has arrived at one of a plurality of predetermined points. The charge standby information is information for notification about that the unmanned flying object 10 waits for charge at one of a plurality of predetermined points. The departure standby information is information for notification about that the unmanned flying object 10 waits until an expected departure time at one of a plurality of predetermined points.

The setting terminal 30 is a terminal for setting a flight route on which the unmanned flying object 10 autonomously flies. The setting terminal 30 is, for example, a personal computer or a server. The setting terminal 30 provides route information, way point information, sunset time information, sunrise time information, notification target information, and travel possible distance information to the unmanned flying object 10.

The route information is information that represents a flight route on which the unmanned flying object 10 autonomously flies. The way point information is information on a point through which the unmanned flying object 10 can pass. The sunset time information is information that represents a sunset time depending on the date at each point through which the unmanned flying object 10 can pass. The sunrise time information is information that represents a sunrise time depending on the date at each point through which the unmanned flying object 10 can pass. The notification target information is information that represents a notification target. The unmanned flying object 10 notifies the notification target about information. The travel possible distance information is table information in which a distance by which the unmanned flying object 10 can travel with a remaining quantity of the battery 106 is associated with the remaining quantity of the battery 106.

The route information, way point information, sunset time information, sunrise time information, notification target information, and travel possible distance information may be provided by the same terminal or different terminals. The sunset time information and sunrise time information may be provided by an external server.

Figure 2:
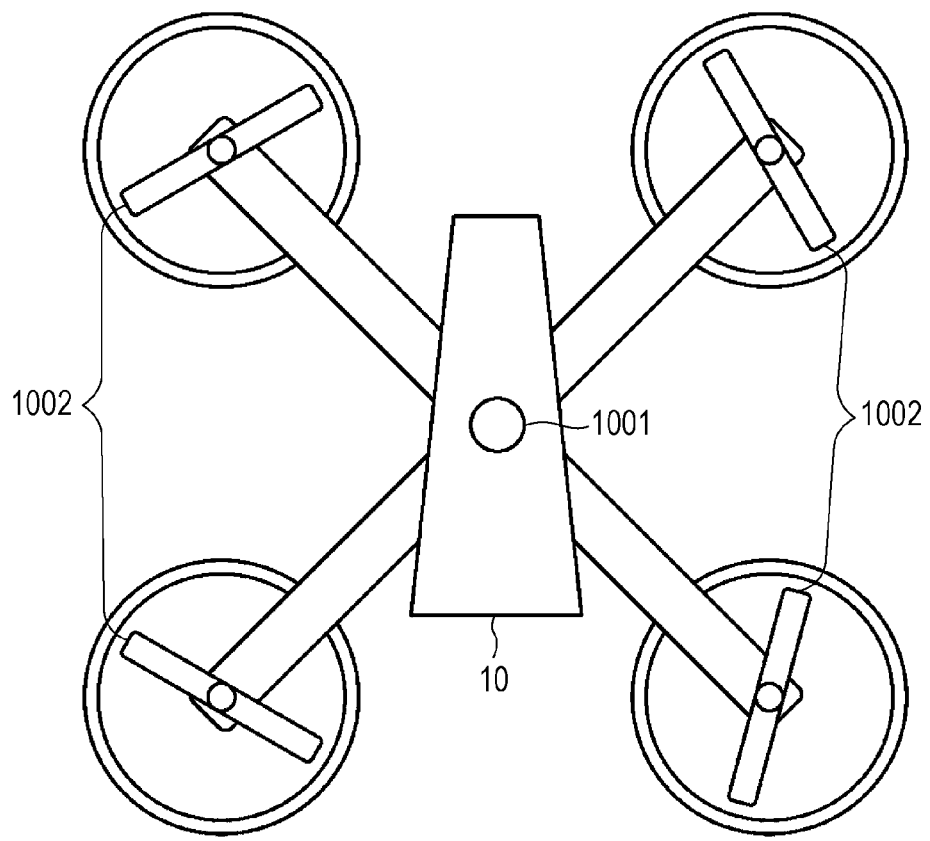
FIG. 2 illustrates the overview of an example of an unmanned flying object according to the first embodiment of the present disclosure.
Figure 3:
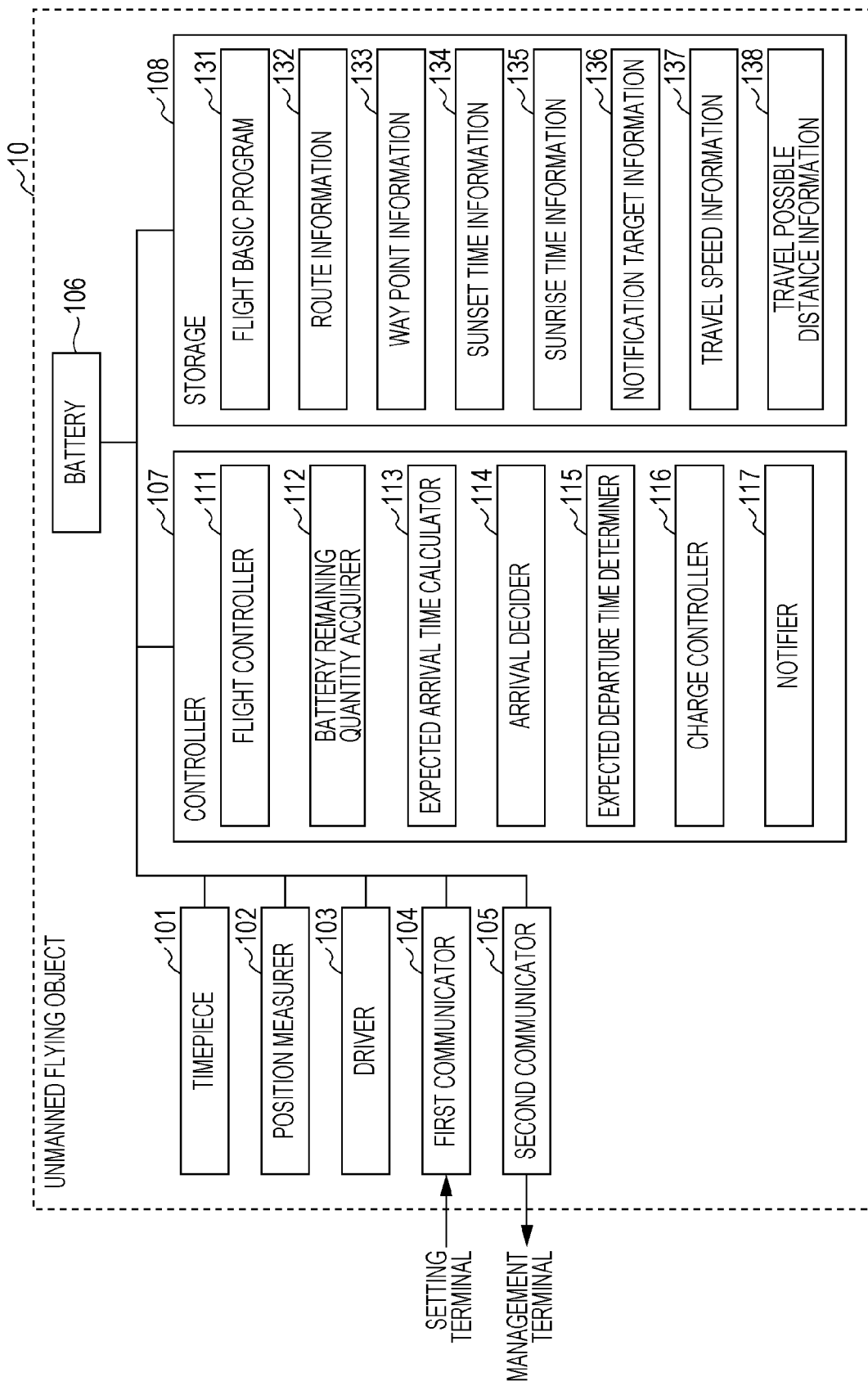
FIG. 3 is a block diagram illustrating a configuration of the unmanned flying object according to the first embodiment of the present disclosure.

FIG. 2 illustrates the overview of an example of an unmanned flying object according to the first embodiment of the present disclosure. FIG. 3 is a block diagram illustrating a configuration of the unmanned flying object according to the first embodiment of the present disclosure.

As shown in FIG. 2, the unmanned flying object 10 at least includes various sensors 1001 and a propulsive device 1002. The unmanned flying object 10 houses a timepiece 101, a position measurer 102, a driver 103, a first communicator 104, a second communicator 105, a battery 106, a controller 107, and a storage 108.

The various sensors 1001 includes, for example, an image sensor or a human sensor, and is desirably mounted depending on the purpose of use of the unmanned flying object 10.

The propulsive device 1002 includes a propeller for obtaining lift, thrust, and torque to cause the unmanned flying object 10 to fly, and a motor that rotates the propeller. In the example in FIG. 2, the unmanned flying object 10 includes four propulsive devices 1002; however, the number of propulsive devices 1002 may be, for example, five or more.

The unmanned flying object 10 illustrated in FIG. 3 includes the timepiece 101, the position measurer 102, the driver 103, the first communicator 104, the second communicator 105, the battery 106, the controller 107, and the storage 108.

The timepiece 101 measures the time and acquires the current time. The position measurer 102 is, for example, GPS, and acquires the current position of the unmanned flying object 10. The current position of the unmanned flying object 10 is expressed by latitude, longitude, and height.

The driver 103 drives the plurality of propulsive devices 1002 that causes the unmanned flying object 10 to fly. The driver 103 causes the plurality of propellers that causes the unmanned flying object 10 to fly.

The first communicator 104 receives the route information, way point information, sunset time information, sunrise time information, notification target information, and travel possible distance information transmitted by the setting terminal 30, for example, through the Internet. The first communicator 104 causes the storage 108 to store the received route information, way point information, sunset time information, sunrise time information, notification target information, and travel possible distance information. The second communicator 105 transmits various information to the management terminal 20 in conformity with a communication standard such as long term evolution (LTE). The second communicator 105 transmits, for example, the arrival information, charge standby information, or departure standby information to the management terminal 20.

The battery 106 is a power supply of the unmanned flying object 10, and supplies respective sections of the unmanned flying object 10 with electric power.

The controller 107 is, for example, a central processing unit (CPU), and controls the operation of the unmanned flying object 10. The controller 107 includes a flight controller 111, a battery remaining quantity acquirer 112, an expected arrival time calculator 113, an arrival decider 114, an expected departure time determiner 115, a charge controller 116, and a notifier 117.

The storage 108 is, for example, a semiconductor memory, and stores various information. The storage 108 includes a flight basic program 131, route information 132, way point information 133, sunset time information 134, sunrise time information 135, notification target information 136, travel speed information 137, and travel possible distance information 138.

The flight basic program 131 is a program for controlling flight of the unmanned flying object 10. The flight controller 111 controls the flight of the unmanned flying object 10 by executing the flight basic program 131.

The route information 132 is information that represents a flight route on which the unmanned flying object 10 autonomously flies, and includes information relating to a plurality of points through which the unmanned flying object 10 passes.

The way point information 133 is information relating to points through which the unmanned flying object 10 can pass, and includes information relating to the positions of the respective points (for example, latitude and longitude), and the distances between the respective points.

The sunset time information 134 is information that represents a sunset time depending on the date at each point through which the unmanned flying object 10 can pass.

The sunrise time information 135 is information that represents a sunrise time depending on the date at each point through which the unmanned flying object 10 can pass.

The notification target information 136 is information that represents a notification target. The unmanned flying object 10 notifies the notification target about information. For example, when the management terminal 20 is notified about the arrival information, charge standby information, or departure standby information, the notification target information represents the address of the management terminal 20.

The travel speed information 137 represents the travel speed of the unmanned flying object 10. The travel speed is a speed previously set in the unmanned flying object 10 when the unmanned flying object 10 autonomously flies. The first communicator 104 may receive the travel speed information set by the setting terminal 30 and may cause the storage 108 to store the travel speed information.

The travel possible distance information 138 is table information in which a distance by which the unmanned flying object 10 can travel with a remaining quantity of the battery 106 is associated with the remaining quantity of the battery 106.

The battery remaining quantity acquirer 112 acquires the current remaining quantity of the battery 106.

When the unmanned flying object 10 starts traveling from a first point of a plurality of points, at which the unmanned flying object 10 is currently located, to a second point, through which the unmanned flying object 10 is going to pass next to the first point, the arrival decider 114 decides whether the unmanned flying object 10 can arrive at the second point, on the basis of an end time of a time zone in which the unmanned flying object 10 is permitted to fly and the remaining quantity of the battery 106.

If the arrival decider 114 decides that the unmanned flying object 10 can arrive at the second point, the flight controller 111 causes the unmanned flying object 10 to depart for the second point. If the arrival decider 114 decides that the unmanned flying object 10 cannot arrive at the second point, the flight controller 111 causes the unmanned flying object 10 to wait at the first point.

The expected arrival time calculator 113 calculates an expected arrival time at which the unmanned flying object 10 arrives at the point (second point) through which the unmanned flying object 10 passes next.

Also, the arrival decider 114 calculates a travel possible distance by which the unmanned flying object 10 can travel from the first point, on the basis of the remaining quantity of the battery 106. The arrival decider 114 decides whether the calculated travel possible distance is equal to or larger than a travel distance between the first point and the second point. If the arrival decider 114 decides that the travel possible distance is equal to or larger than the travel distance, the arrival decider 114 decides whether the calculated expected arrival time is after the end time (for example, sunset time). If the arrival decider 114 decides that the expected arrival time is not after the end time (for example, sunset time), the arrival decider 114 decides that the unmanned flying object 10 can arrive at the second point. If the arrival decider 114 decides that the expected arrival time is after the end time (for example, sunset time), the arrival decider 114 decides that the unmanned flying object 10 cannot arrive at the second point.

If the arrival decider 114 decides that the unmanned flying object 10 cannot arrive at the second point, the expected departure time determiner 115 determines a time at a start time (for example, sunrise time) or later of a next time zone in which the unmanned flying object 10 is permitted to fly, as an expected departure time at which the unmanned flying object 10 departs for the second point.

If the arrival decider 114 decides that the travel possible distance is not equal to or larger than the travel distance, the charge controller 116 causes a charging device to start charging the battery 106.

If it is decided that the unmanned flying object 10 cannot arrive at the second point, the notifier 117 notifies the user about that the unmanned flying object waits at the first point.

Also, the battery remaining quantity acquirer 112 acquires the remaining quantity of the battery 106 during the connection with the charging device. The arrival decider 114 calculates a travel possible distance by which the unmanned flying object 10 can travel from the first point, on the basis of the remaining quantity of the battery 106 acquired during the connection with the charging device. The arrival decider 114 decides whether the calculated travel possible distance is equal to or larger than the travel distance between the first point and the second point. If the arrival decider 114 decides that the travel possible distance is equal to or larger than the travel distance, the arrival decider 114 decides whether the calculated expected arrival time is after the end time (for example, sunset time). If the arrival decider 114 decides that the expected arrival time is not after the end time (for example, sunset time), the arrival decider 114 decides that the unmanned flying object 10 can arrive at the second point. If the arrival decider 114 decides that the expected arrival time is after the end time (for example, sunset time), the arrival decider 114 decides that the unmanned flying object 10 cannot arrive at the second point.

A specific operation of the unmanned flying object 10 according to the first embodiment is described now.

Figure 4:
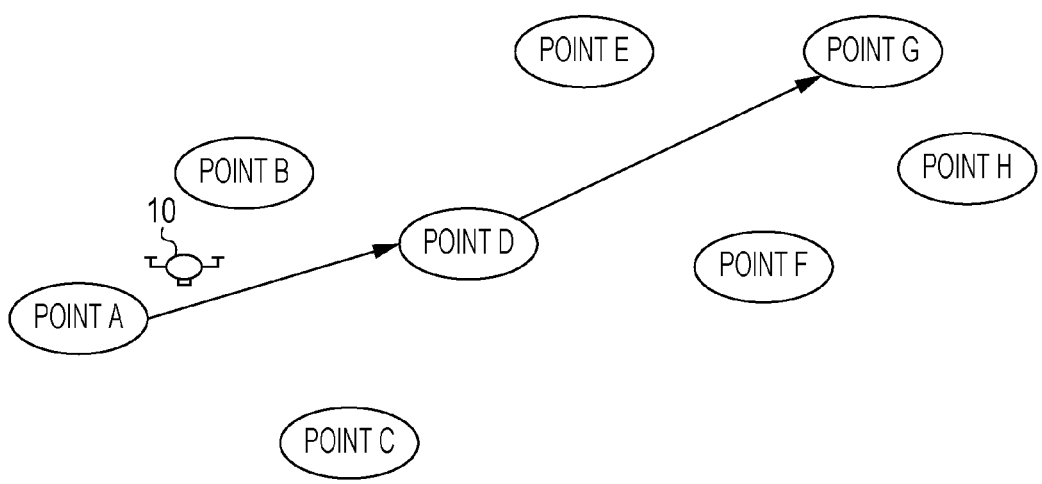
FIG. 4 is a schematic view for explaining a specific operation of the unmanned flying object according to the first embodiment.

FIG. 4 is a schematic view for explaining the specific operation of the unmanned flying object 10 according to the first embodiment.

In FIG. 4, the unmanned flying object 10 departs from a point A of a plurality of points A to H through which the unmanned flying object 10 can pass, and passes through the point D, and arrives at the point G. In this case, the setting terminal 30 transmits route information indicative of that the point A is set as the departure point, the point D is set as the way point, and the point G is set as the destination point to the unmanned flying object 10. The unmanned flying object 10 starts autonomously flying on the basis of the received route information.

When the unmanned flying object 10 departs from the point A and arrives at the point D, the unmanned flying object 10 decides whether the unmanned flying object 10 can arrive at the point G with the current battery remaining quantity. If the unmanned flying object 10 decides that the unmanned flying object 10 can arrive at the point G with the current battery remaining quantity, the unmanned flying object 10 decides whether the unmanned flying object 10 can arrive at the point G by the sunset time. If the unmanned flying object 10 decides that the unmanned flying object 10 can arrive at the point G by the sunset time, the unmanned flying object 10 departs for the point G.

If the unmanned flying object 10 decides that the unmanned flying object 10 cannot arrive at the point G with the current battery remaining quantity, the unmanned flying object 10 waits at the point D, and starts charge of the battery at the point D. Then, the unmanned flying object 10 decides whether the unmanned flying object 10 can arrive at the point G with the current battery remaining quantity every predetermined time interval. When the unmanned flying object 10 decides that the unmanned flying object 10 can arrive at the point G with the current battery remaining quantity, the unmanned flying object 10 decides whether the unmanned flying object 10 can arrive at the point G by the sunset time. If the unmanned flying object 10 decides that the unmanned flying object 10 can arrive at the point G by the sunset time, the unmanned flying object 10 departs for the point G.

In this case, the unmanned flying object 10 decides whether the unmanned flying object 10 can arrive at the point G by the sunset time when the battery remaining quantity becomes the remaining quantity by which the unmanned flying object 10 can arrive at the point G since the charge of the battery has been started at the point D. However, the present disclosure is not limited to the case. The unmanned flying object 10 may decide whether the unmanned flying object 10 can arrive at the point G by the sunset time when the charge of the battery is completed since the charge of the battery is started at the point D.

If the unmanned flying object 10 decides that the unmanned flying object 10 cannot arrive at the point G by the sunset time, the unmanned flying object 10 waits at the point G. At the sunrise time on the next day, the unmanned flying object 10 departs for the point G. The unmanned flying object 10 may charge the battery while waiting at the point D until the sunrise time on the next day.

Flight control processing of the unmanned flying object 10 according to the first embodiment is described next.

Figure 5:
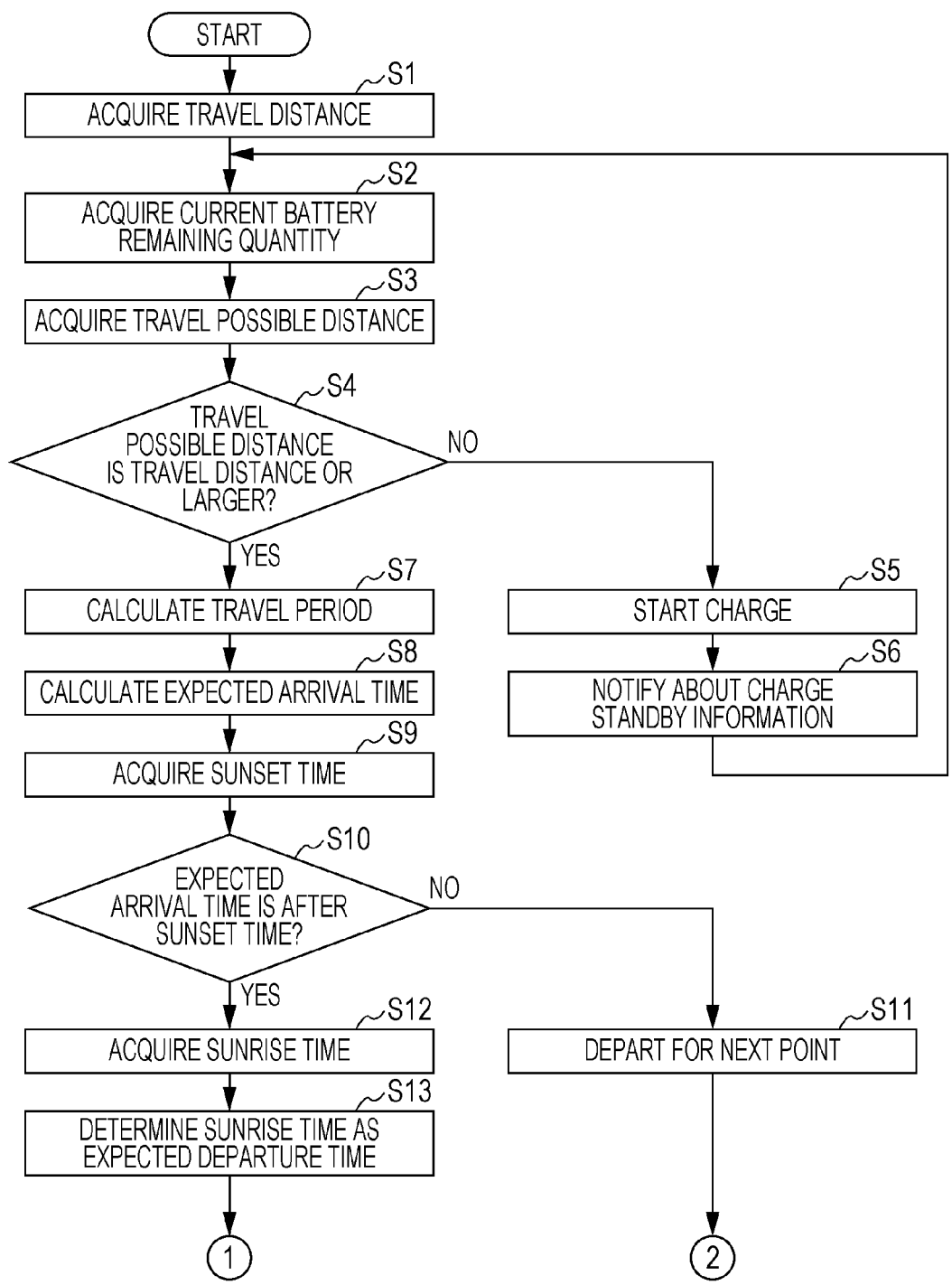
FIG. 5 is a first flowchart for explaining flight control processing on the unmanned flying object according to the first embodiment of the present disclosure.
Figure 6:
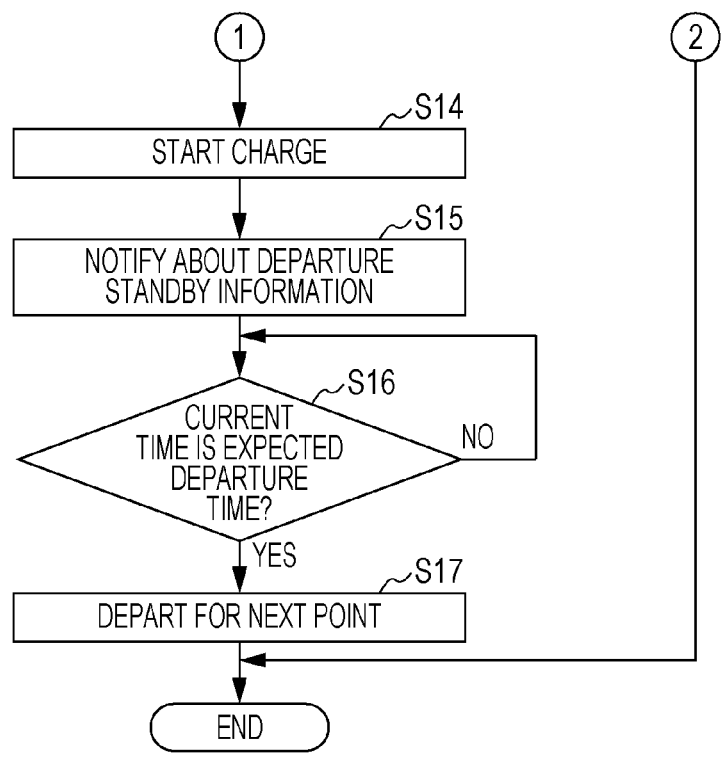
FIG. 6 is a second flowchart for explaining the flight control processing on the unmanned flying object according to the first embodiment of the present disclosure.

FIG. 5 is a first flowchart for explaining the flight control processing on the unmanned flying object 10 according to the first embodiment of the present disclosure. FIG. 6 is a second flowchart for explaining the flight control processing on the unmanned flying object 10 according to the first embodiment of the present disclosure.

When the unmanned flying object 10 arrives at a predetermined point, in step S1, the arrival decider 114 reads out the route information 132 and the way point information 133 from the storage 108, specifies the next point to which the unmanned flying object 10 travels from the current point, and acquires the travel distance from the current point to the next point.

Then, in step S2, the battery remaining quantity acquirer 112 acquires the current remaining quantity of the battery 106.

Then, in step S3, the arrival decider 114 reads out the travel possible distance information 138 from the storage 108, and acquires the travel possible distance corresponding to the acquired current remaining quantity of the battery 106.

Then, in step S4, the arrival decider 114 decides whether the travel possible distance is equal to or larger than the travel distance. That is, if the travel possible distance is equal to or larger than the travel distance, the unmanned flying object 10 can arrive at the next point with the current remaining quantity of the battery 106. If the travel possible distance is smaller than the travel distance, the unmanned flying object 10 cannot arrive at the next point with the current remaining quantity of the battery 106. If it is decided that the travel possible distance is not equal to or larger than the travel distance, that is, if it is decided that the unmanned flying object 10 cannot arrive at the next point with the current remaining quantity of the battery 106 (NO in step S4), in step S5, the charge controller 116 starts charging to the battery 106. The unmanned flying object 10 is connected to the charging device for charging the battery 106 when the unmanned flying object 10 lands on a predetermined point. The charging device may supply the battery 106 with electric power, for example, by non-contact power transfer.

Then, in step S6, the notifier 117 notifies the management terminal 20 about the charge standby information indicative of that the unmanned flying object 10 cannot arrive at the next point with the current battery remaining quantity and hence charge is started, through the second communicator 105. After the notification about the charge standby information, the processing returns to the processing in step S2. After the notification about the charge standby information, the arrival decider 114 decides whether a predetermined period has elapsed, and if the arrival decider 114 decides that the predetermined period has elapsed, the processing in step S2 may be performed. Alternatively, the notification about the charge standby information may not be made.

In contrast, if it is decided that the travel possible distance is equal to or larger than the travel distance, that is, if it is decided that the unmanned flying object 10 can arrive at the next point with the current remaining quantity of the battery 106 (YES in step S4), in step S7, the expected arrival time calculator 113 reads out the travel speed information 137 from the storage 108, divides the travel distance from the current point to the next point by the travel speed, and hence calculates the travel period from the current point to the next point. The expected arrival time calculator 113 may correct the travel speed in accordance with the wind speed and wind direction from the current point to the next point.

Then, in step S8, the expected arrival time calculator 113 acquires the current time from the timepiece 101, and calculates the expected arrival time at which the unmanned flying object 10 arrives at the next point, on the basis of the travel period from the current point to the next point and the current time. That is, the expected arrival time calculator 113 calculates a time at which a predetermined period has elapsed since the current time, as an expected arrival time.

Then, in step S9, the arrival decider 114 reads out the sunset time information 134 from the storage 108 and acquires the sunset time. The sunset time according to the first embodiment is a sunset time corresponding to the current point (first point); however, may be a sunset time corresponding to the next point (second point).

Then, in step S10, the arrival decider 114 decides whether the expected arrival time is after the sunset time.

If it is decided that the expected arrival time is not after the sunset time (NO in step S10), in step S11, since the unmanned flying object 10 can arrive at the next point by the sunset time, the flight controller 111 causes the unmanned flying object 10 to depart for the next point.

In contrast, if it is decided that the expected arrival time is after the sunset time (YES in step S10), in step S12, since the unmanned flying object 10 cannot arrive at the next point by the sunset time, the expected departure time determiner 115 reads out the sunrise time information 135 from the storage 108, and acquires the sunrise time on the next day. The sunrise time according to the first embodiment is a sunrise time corresponding to the current point.

Then, in step S13, the expected departure time determiner 115 determines the acquired sunrise time on the next day as an expected departure time for restart from the current point to the next point, and causes the storage 108 to store the determined expected departure time. The expected departure time may be a time at the sunrise time or later.

Then, in step S14, the charge controller 116 starts charging the battery 106. The charge controller 116 charges the battery 106 until the charge of the battery 106 is completed or until the expected departure time.

Then, in step S15, the notifier 117 notifies the management terminal 20 about the departure standby information indicative of that the unmanned flying object 10 cannot arrive at the next point by the sunset time and hence waits, through the second communicator 105. Alternatively, the notification about the departure standby information may not be made.

Then, in step S16, the flight controller 111 acquires the current time from the timepiece 101, and decides whether the acquired current time is the expected departure time. If it is decided that the current time is not the expected departure time (NO in step S16), the flight controller 111 waits until the current time becomes the expected departure time.

In contrast, if it is decided that the current time is the expected departure time (YES in step S16), in step S17, the flight controller 111 causes the unmanned flying object 10 to depart for the next point.

As described above, even though the unmanned flying object 10 can travel to the next point with the battery remaining quantity, if the unmanned flying object 10 cannot travel to the next point by the end time of the time zone in which the unmanned flying object 10 is permitted to fly, the unmanned flying object 10 waits at the current point. Accordingly, flight of the unmanned flying object 10 after the end time of the time zone in which the unmanned flying object 10 is permitted to fly can be prevented.

While the end time of the time zone in which the unmanned flying object 10 is permitted to fly is the sunset time according to the first embodiment, the present disclosure is not limited thereto. For example, a predetermined time, such as 17:00 or 18:00, may be set as the end time. The start time of the time zone in which the unmanned flying object 10 is permitted to fly is the sunrise time according to the first embodiment; however, the present disclosure is not limited thereto. For example, a predetermined time, such as 6:00 or 7:00, may be set as the start time, or a time at the sunrise time or before, or a time at the sunrise time or later may be set as the start time.

The unmanned flying object 10 notifies the management terminal 20 about the charge standby information indicative of that the unmanned flying object 10 cannot arrive at the next point with the current battery remaining quantity and hence starts charge, or the departure standby information indicative of that the unmanned flying object 10 cannot arrive at the next point by the sunset time and hence waits; however, the present disclosure is not limited thereto. The unmanned flying object 10 or the charging device may be provided with a display, and the charge standby information or the departure standby information may be displayed on the display.

Also, in the first embodiment, the storage 108 may store charge availability information indicative of whether the charging device is present at each of the plurality of points. In this case, if it is decided that the travel possible distance is not equal to or larger than the travel distance, the flight controller 111 references the charge availability information, and decides whether the charging device is present at the current point. If the flight controller 111 determines that the charging device is not present at the current point, the flight controller 111 may reference the charge availability information, specify a point which is within the range of the travel possible distance, which is within a predetermined range from the current point, and at which the charging device is present, and cause the unmanned flying object 10 to depart for the specified point.

Also, in the first embodiment, the server connected to the unmanned flying object 10 through the network 40 may have the function of the unmanned flying object 10. That is, a controller of the server may include the expected arrival time calculator 113, the arrival decider 114, the expected departure time determiner 115, and the notifier 117 of the unmanned flying object 10; a storage of the server may include the route information 132, the way point information 133, the sunset time information 134, the sunrise time information 135, the notification target information 136, the travel speed information 137, and the travel possible distance information 138.

Second Embodiment

In a second embodiment, if the expected arrival time at which the unmanned flying object arrives at the next point is after the sunset time, a new point at which the unmanned flying object can arrive by the sunset time and which is close to the next point is searched, and the unmanned flying object departs for the searched new point.

Figure 7:
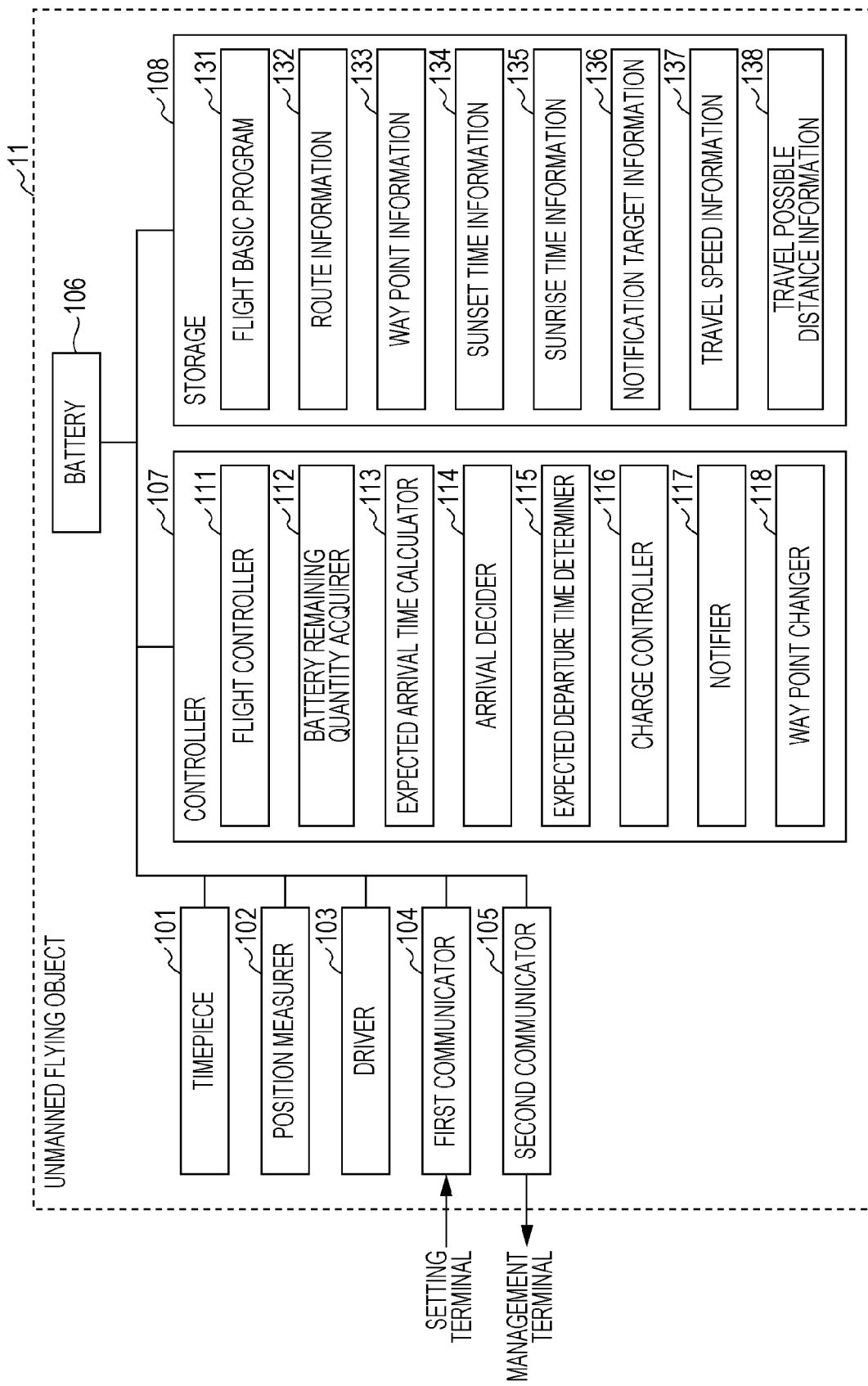
FIG. 7 is a block diagram illustrating a configuration of an unmanned flying object according to a second embodiment of the present disclosure.

FIG. 7 is a block diagram illustrating a configuration of an unmanned flying object 11 according to the second embodiment of the present disclosure. The configuration of the flight control system according to the second embodiment is similar to that illustrated in FIG. 1, and hence the description thereof is omitted.

The unmanned flying object 11 illustrated in FIG. 7 includes the timepiece 101, the position measurer 102, the driver 103, the first communicator 104, the second communicator 105, the battery 106, the controller 107, and the storage 108. In the second embodiment, the description of the configuration similar to that of the first embodiment is omitted.

The controller 107 controls the operation of the unmanned flying object 11. The controller 107 includes the flight controller 111, the battery remaining quantity acquirer 112, the expected arrival time calculator 113, the arrival decider 114, the expected departure time determiner 115, the charge controller 116, the notifier 117, and a way point changer 118.

If it is decided that the unmanned flying object 11 cannot arrive at a second point (next point previously determined as flight route), the way point changer 118 determines a point, at which the unmanned flying object 11 can arrive by the end time (for example, sunset time) and which is within a predetermined range from the second point, from a plurality of points, as a new third point through which the unmanned flying object 11 newly passes. In this case, if it is decided that the unmanned flying object 11 cannot arrive at the second point (next point previously determined as flight route), the way point changer 118 may determine a point, at which the unmanned flying object 11 can arrive by the end time (for example, sunset time) and which is the closest to the second point, from a plurality of points, as a third point through which the unmanned flying object 11 newly passes.

The flight controller 111 causes the unmanned flying object 11 to depart for the third point determined by the way point changer 118.

A specific operation of the unmanned flying object 11 according to the second embodiment is described now.

Figure 8:
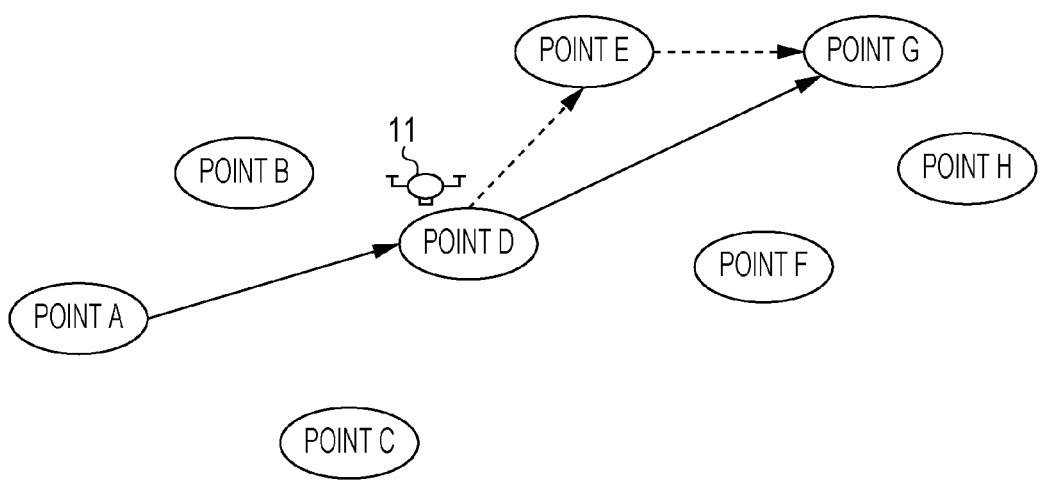
FIG. 8 is a schematic view for explaining a specific operation of the unmanned flying object according to the second embodiment.

FIG. 8 is a schematic view for explaining the specific operation of the unmanned flying object 11 according to the second embodiment.

In FIG. 8, the unmanned flying object 11 departs from a point A of a plurality of points A to H through which the unmanned flying object 11 can pass, and passes through the point D, and arrives at the point G. In this case, the setting terminal 30 transmits route information indicative of that the point A is set as the departure point, the point D is set as the way point, and the point G is set as the destination point to the unmanned flying object 11. The unmanned flying object 11 starts autonomously flying on the basis of the received route information.

When the unmanned flying object 11 departs from the point A and arrives at the point D, the unmanned flying object 11 decides whether the unmanned flying object 11 can arrive at the point G with the current battery remaining quantity. If the unmanned flying object 11 decides that the unmanned flying object 11 can arrive at the point G with the current battery remaining quantity, the unmanned flying object 11 decides whether the unmanned flying object 11 can arrive at the point G by the sunset time. If the unmanned flying object 11 decides that the unmanned flying object 11 can arrive at the point G by the sunset time, the unmanned flying object 11 departs for the point G.

If the unmanned flying object 11 decides that the unmanned flying object 11 cannot arrive at the point G with the current battery remaining quantity, the unmanned flying object 11 waits at the point D, and starts charge of the battery at the point D. The unmanned flying object 11 decides whether the unmanned flying object 11 can arrive at the point G with the current battery remaining quantity every predetermined time interval. When the unmanned flying object 11 decides that the unmanned flying object 11 can arrive at the point G with the current battery remaining quantity, the unmanned flying object 11 decides whether the unmanned flying object 11 can arrive at the point G by the sunset time. If the unmanned flying object 11 decides that the unmanned flying object 11 can arrive at the point G by the sunset time, the unmanned flying object 11 departs for the point G.

In this case, the unmanned flying object 11 decides whether the unmanned flying object 11 can arrive at the point G by the sunset time when the battery remaining quantity becomes the remaining quantity by which the unmanned flying object 11 can arrive at the point G since the charge of the battery has been started at the point D. However, the present disclosure is not limited to the case. The unmanned flying object 11 may decide whether the unmanned flying object 11 can arrive at the point G by the sunset time when the charge of the battery is completed since the charge of the battery is started at the point D.

If it is decided that the unmanned flying object 11 cannot arrive at the point G by the sunset time, the unmanned flying object 11 extracts a point, at which the travel distance to the point D is smaller than the travel distance between the point D and the point G, from a plurality of points to which the unmanned flying object 11 can travel. The unmanned flying object 11 decides whether the unmanned flying object 11 can arrive at each of the extracted points by the sunset time in the order from the point at the shorter distance to the point G. The unmanned flying object 11 determines a point decided as a point at which the unmanned flying object 11 can arrive by the sunset time first, as a new point to which the unmanned flying object 11 travels next. In the example illustrated in FIG. 8, the point E is newly determined as a point which has the smallest distance to the point G, and at which the unmanned flying object 11 can arrive by the sunset time. The unmanned flying object 11 departs for the newly determined point E. The unmanned flying object 11 which has arrived at the newly determined point E waits at the point E. At the sunrise time on the next day, the unmanned flying object 11 departs for the point G.

If there is no point which has a smaller travel distance to the point D than the travel distance between the point D and the point G, or if there is no point among the extracted points at which the unmanned flying object 11 can arrive by the sunset time, the unmanned flying object 11 waits at the point D. At the sunrise time on the next day, the unmanned flying object 11 departs for the point G. The unmanned flying object 11 may charge the battery while waiting at the point D until the sunrise time on the next day.

Flight control processing of the unmanned flying object 11 according to the second embodiment is described next.

Figure 9:
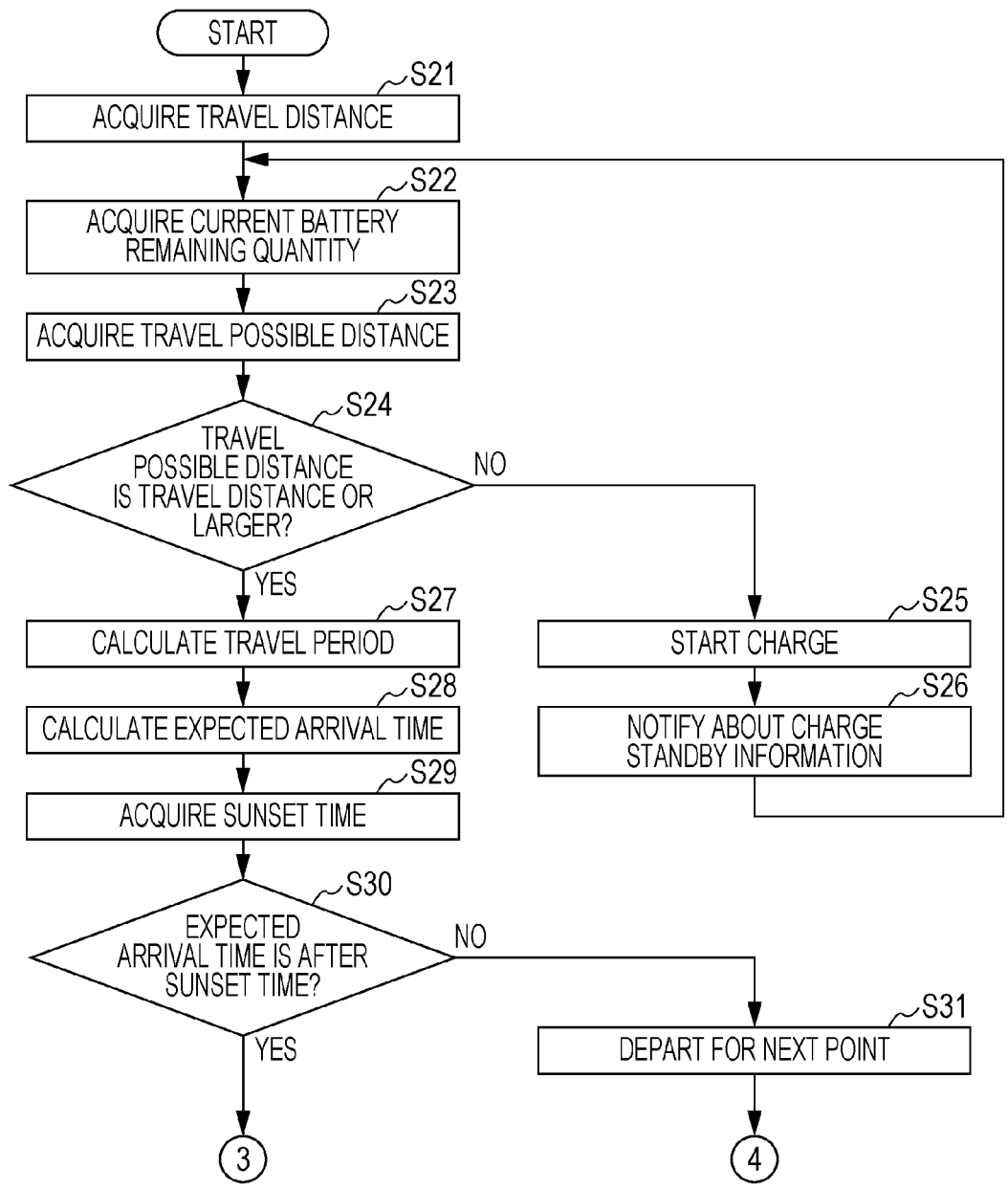
FIG. 9 is a first flowchart for explaining flight control processing on the unmanned flying object according to the second embodiment of the present disclosure.
Figure 10:
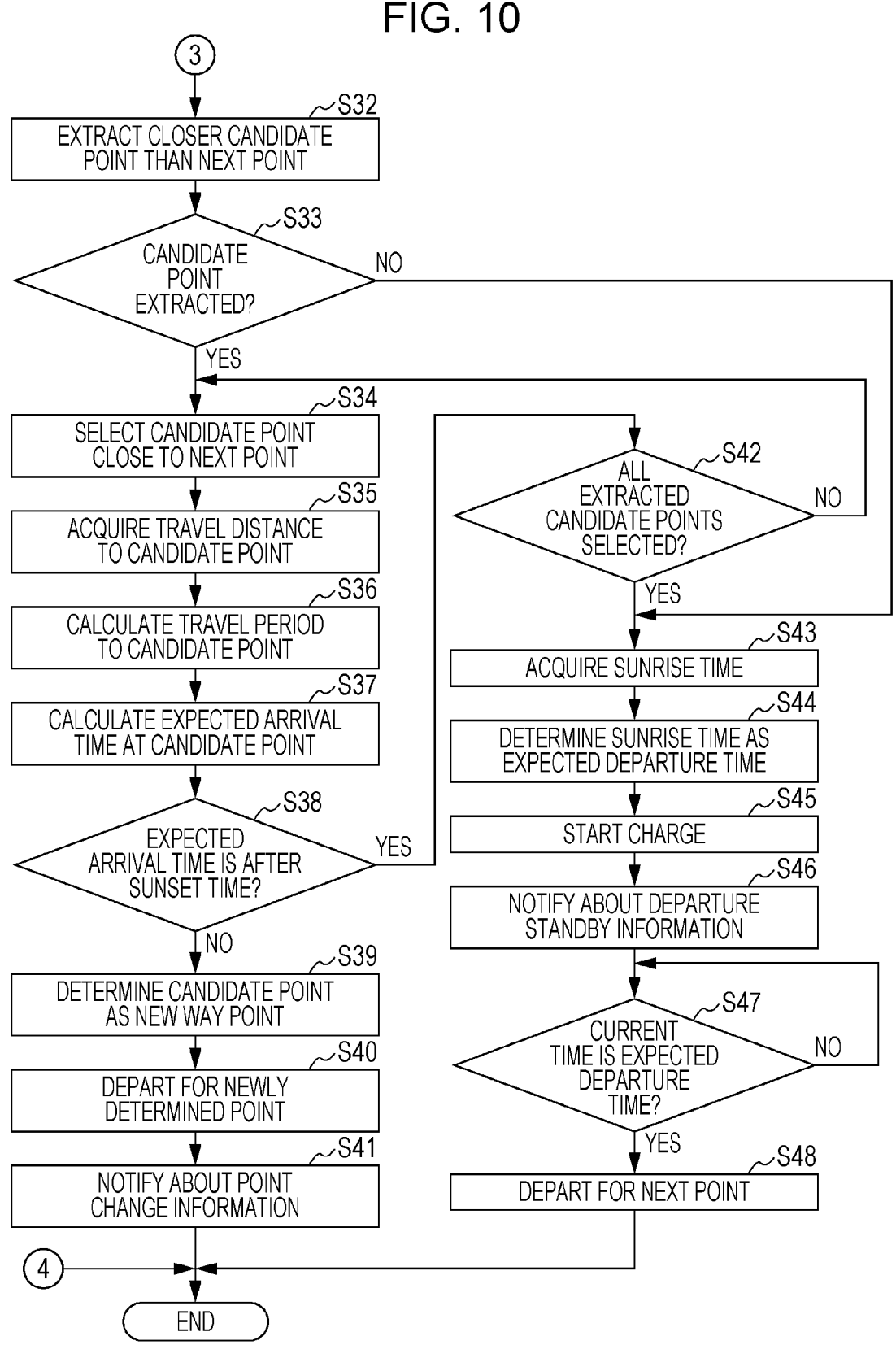
FIG. 10 is a second flowchart for explaining the flight control processing on the unmanned flying object according to the second embodiment of the present disclosure.

FIG. 9 is a first flowchart for explaining the flight control processing on the unmanned flying object 11 according to the second embodiment of the present disclosure. FIG. 10 is a second flowchart for explaining the flight control processing on the unmanned flying object 11 according to the second embodiment of the present disclosure.

The processing from step S21 to step S31 illustrated in FIG. 9 is the same as the processing from step S1 to step S11 illustrated in FIG. 5, and hence the redundant description thereof is omitted.

If it is decided that the expected arrival time is after the sunset time (YES in step S30), in step S32, the way point changer 118 extracts a closer candidate point than the next point. To be specific, the way point changer 118 extracts a point at a smaller travel distance from the current point than the travel distance between the current point and the next point, as a candidate point from a plurality of points to which the unmanned flying object 11 can travel.

Then, in step S33, the way point changer 118 decides whether the candidate point has been extracted. If it is decided that the candidate point has not been extracted (NO in step S33), the processing goes to processing in step S43.

If it is decided that the candidate point has been extracted (YES in step S33), in step S34, the way point changer 118 references the way point information 133, and selects a candidate point close to the next point from the extracted candidate points. Since the way point information 133 includes the distances between the respective points, the way point changer 118 references the way point information 133, and selects a candidate point with the smallest distance between the candidate point and the next point, from the extracted candidate points.

Then, in step S35, the way point changer 118 references the way point information 133, and acquires the travel distance from the current point to the selected candidate point.

Then, in step S36, the way point changer 118 reads out the travel speed information 137 from the storage 108, and divides the travel distance from the current point to the selected candidate point by the travel speed, and hence calculates the travel period from the current point to the selected candidate point.

Then, in step S37, the way point changer 118 acquires the current time from the timepiece 101, and calculates the expected arrival time at which the unmanned flying object 11 arrives at the selected candidate point, on the basis of the travel period from the current point to the selected candidate point and the current time. That is, the way point changer 118 calculates a time at which a predetermined period has elapsed since the current time, as an expected arrival time.

Then, in step S38, the way point changer 118 decides whether the expected arrival time is after the sunset time.

If it is decided that the expected arrival time is not after the sunset time (NO in step S38), in step S39, the way point changer 118 determines the selected candidate point as a new way point.

Then, in step S40, since the unmanned flying object 11 can arrive at the newly determined point by the sunset time, the flight controller 111 causes the unmanned flying object 11 to depart for the newly determined point.

Then, in step S41, the notifier 117 notifies the management terminal 20 about the point change information indicative of that the point to which the unmanned flying object 11 travels next not to a predetermined point, but to the newly determined point, through the second communicator 105. Alternatively, the notification about the point change information may not be made.

If it is decided that the expected arrival time is after the sunset time (YES in step S38), in step S42, the way point changer 118 decides whether all the extracted candidate points have been selected. If it is decided that not all the extracted candidate points have been selected (NO in step S42), the processing returns to the processing in step S34, in which the way point changer 118 references the way point information 133 and selects a candidate point close to the next point from the residual extracted candidate points.

If it is decided that all the extracted candidate points have been selected (YES in step S42), in step S43, the unmanned flying object 11 cannot arrive at the next point by the sunset time, and hence the expected departure time determiner 115 reads out the sunrise time information 135 from the storage 108, and acquires the sunrise time on the next day.

The processing from step S43 to step S48 illustrated in FIG. 10 is the same as the processing from step S12 to step S17 illustrated in FIGS. 5 and 6, and hence the redundant description thereof is omitted.

As described above, if the unmanned flying object 11 cannot travel to the next point by the end time of the time zone in which the unmanned flying object 11 is permitted to fly, the point which is closer to the next point than the current point and to which the unmanned flying object 11 can travel by the end time is newly extracted, and the unmanned flying object 11 travels to the newly extracted point. Accordingly, the unmanned flying object 11 can arrive at the destination earlier.

While the way point changer 118 extracts the candidate point closer to the next point in the step S32 according to the second embodiment, the present disclosure is not limited thereto. The way point changer 118 may extract a candidate point which is closer to the next point and at which the charging device is provided. Accordingly, the battery can be reliably charged at the point to which the unmanned flying object 11 has traveled.

Also, in the second embodiment, the server connected to the unmanned flying object 11 through the network 40 may have the function of the unmanned flying object 11. That is, a controller of the server may include the expected arrival time calculator 113, the arrival decider 114, the expected departure time determiner 115, the notifier 117, and the way point changer 118 of the unmanned flying object 11; a storage of the server may include the route information 132, the way point information 133, the sunset time information 134, the sunrise time information 135, the notification target information 136, the travel speed information 137, and the travel possible distance information 138.

Third Embodiment

In the first and second embodiments, it is decided whether the unmanned flying object can arrive at the second point, to which the unmanned flying object travels next to the first point when the unmanned flying object arrives at the first point. However, at the time point when the unmanned flying object departs from the first point, even though it is decided that the unmanned flying object can arrive at the second point, the unmanned flying object becomes not able to arrive at the second point during flight due to the influence of the wind or deterioration over time of the battery. Therefore, according to a third embodiment, it is decided whether the unmanned flying object can arrive at the second point during flight from the first point to the second point, and if it is decided that the unmanned flying object cannot arrive at the second point, the flight route is changed.

Figure 11:
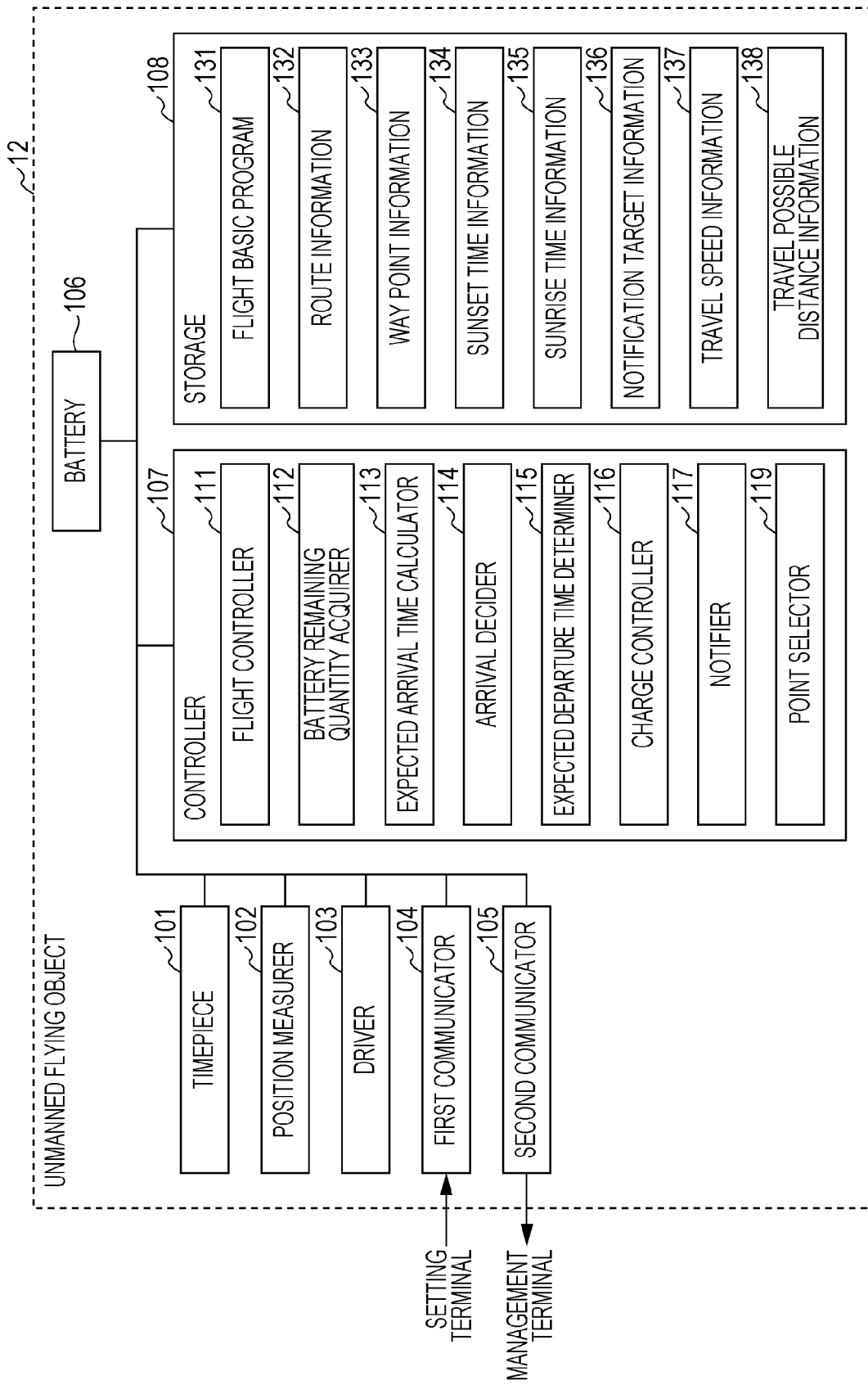
FIG. 11 is a block diagram illustrating a configuration of an unmanned flying object according to a third embodiment of the present disclosure.

FIG. 11 is a block diagram illustrating a configuration of an unmanned flying object 12 according to the third embodiment of the present disclosure. The configuration of the flight control system according to the third embodiment is similar to that illustrated in FIG. 1, and hence the description thereof is omitted.

The unmanned flying object 12 illustrated in FIG. 11 includes the timepiece 101, the position measurer 102, the driver 103, the first communicator 104, the second communicator 105, the battery 106, the controller 107, and the storage 108. In the third embodiment, the description of the configuration similar to that of the first embodiment is omitted.

The controller 107 controls the operation of the unmanned flying object 12. The controller 107 includes the flight controller 111, the battery remaining quantity acquirer 112, the expected arrival time calculator 113, the arrival decider 114, the expected departure time determiner 115, the charge controller 116, the notifier 117, and a point selector 119.

The arrival decider 114 decides whether the unmanned flying object 12 can arrive at the second point during flight from the first point to the second point, on the basis of the end time (for example, sunset time) of the time zone in which the unmanned flying object 12 is permitted to fly and the remaining quantity of the battery 106.

If it is decided that the unmanned flying object 12 can arrive at the second point by the end time of the time zone in which the unmanned flying object 12 is permitted to fly, and that the unmanned flying object 12 cannot arrive at the second point with the current remaining quantity of the battery 106, the point selector 119 selects a point to which the unmanned flying object 12 can travel with the current remaining quantity of the battery 106 and which is the closest to the second point, as a fourth point that is a new travel target.

Also, if it is decided that the unmanned flying object 12 cannot arrive at the second point by the end time of the time zone in which the unmanned flying object 12 is permitted to fly, and the unmanned flying object 12 cannot arrive at the second point with the current remaining quantity of the battery 106, the point selector 119 compares a flight possible distance by which the unmanned flying object 12 can fly by the end time, with the travel possible distance by which the unmanned flying object 12 can travel with the current remaining quantity of the battery 106. If the point selector 119 decides that the flight possible distance is equal to or larger than the travel possible distance, the point selector 119 selects a point which is within the range of the travel possible distance, and which is the closest to the second point, as the fourth point that is the new travel target. In contrast, if the point selector 119 decides that the flight possible distance is smaller than the travel possible distance, the point selector 119 selects a point which is within the range of the flight possible distance, and which is the closest to the second point, as a fourth point that is a new travel target.

If it is decided that the unmanned flying object 12 cannot arrive at the second point, the flight controller 111 causes the unmanned flying object 12 to travel to the fourth point, at which the unmanned flying object 12 can arrive by the end time and which is within a predetermined range from the second point, as a fourth point among a plurality of points. At this time, if it is decided that the unmanned flying object 12 cannot arrive at the second point, the flight controller 111 may cause the unmanned flying object 12 to travel to the fourth point, at which the unmanned flying object 12 can arrive by the end time and which is the closest to the second point, as a fourth point among a plurality of points.

If it is decided that the unmanned flying object 12 cannot arrive at the second point, the notifier 117 may notify the management terminal 20 about that the unmanned flying object 12 cannot arrive at the second point.

A specific operation of the unmanned flying object 12 according to the third embodiment is described now.

Figure 12:
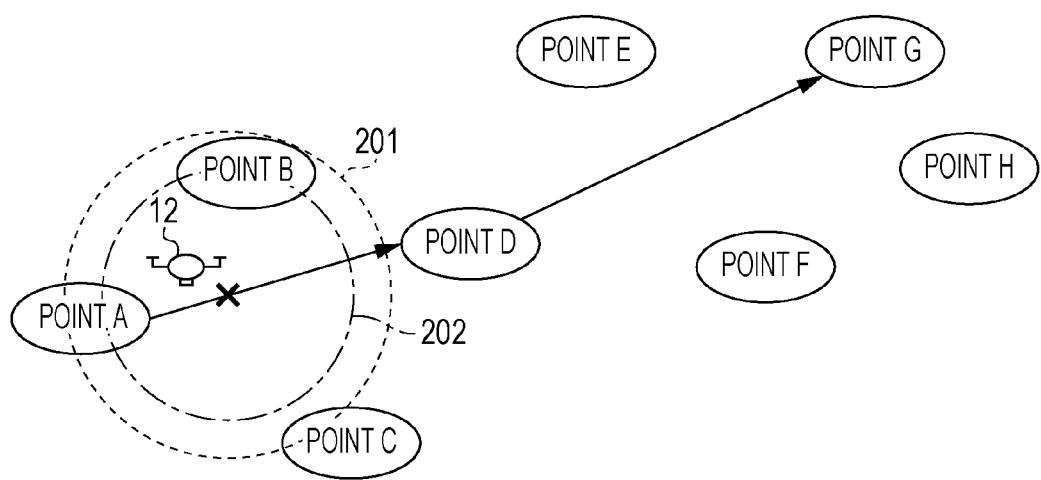
FIG. 12 is a schematic view for explaining a specific operation of the unmanned flying object according to the third embodiment.

FIG. 12 is a schematic view for explaining the specific operation of the unmanned flying object 12 according to the third embodiment.

In FIG. 12, the unmanned flying object 12 departs from a point A of a plurality of points A to H through which the unmanned flying object 12 can pass, and passes through the point D, and arrives at the point G. In this case, the setting terminal 30 transmits route information indicative of that the point A is set as the departure point, the point D is set as the way point, and the point G is set as the destination point to the unmanned flying object 12. The unmanned flying object 12 starts autonomously flying on the basis of the received route information.

First, the unmanned flying object 12 decides whether the unmanned flying object 12 can arrive at the point D by the sunset time during flight from the point A to the point D. If the unmanned flying object 12 decides that the unmanned flying object 12 can arrive at the point D by the sunset time, the unmanned flying object 12 decides whether the unmanned flying object 12 can arrive at the point D with the current battery remaining quantity. If the unmanned flying object 12 decides that the unmanned flying object 12 can arrive at the point D with the current battery remaining quantity, the unmanned flying object 12 flies toward the point D without change.

If it is decided that the unmanned flying object 12 can arrive at the point D by the sunset time but cannot arrive at the point D with the current battery remaining quantity, the unmanned flying object 12 selects a point to which the unmanned flying object 12 can travel with the current remaining quantity of the battery 106 and which is the closest to the second point, as a new travel target, and travels to the selected point.

If it is decided that the unmanned flying object 12 cannot arrive at the point D by the sunset time and cannot arrive at the point D with the current battery remaining quantity, the unmanned flying object 12 decides whether a flight possible distance 201 by which the unmanned flying object 12 can fly by the end time is equal to or larger than a travel possible distance 202 by which the unmanned flying object 12 can travel with the current remaining quantity of the battery 106. If it is decided that the flight possible distance 201 is equal to or larger than the travel possible distance 202, the unmanned flying object 12 selects the point B which is within the range of the travel possible distance 202 and which is the closest to the point D, as a new travel target, and travels to the selected point B. In contrast, if it is decided that the flight possible distance 201 is smaller than the travel possible distance 202, the unmanned flying object 12 selects a point which is within the range of the flight possible distance 201 and which is the closest to the point D, as a new travel target, and travels to the selected point.

Flight control processing of the unmanned flying object 12 according to the third embodiment is described next.

Figure 13:
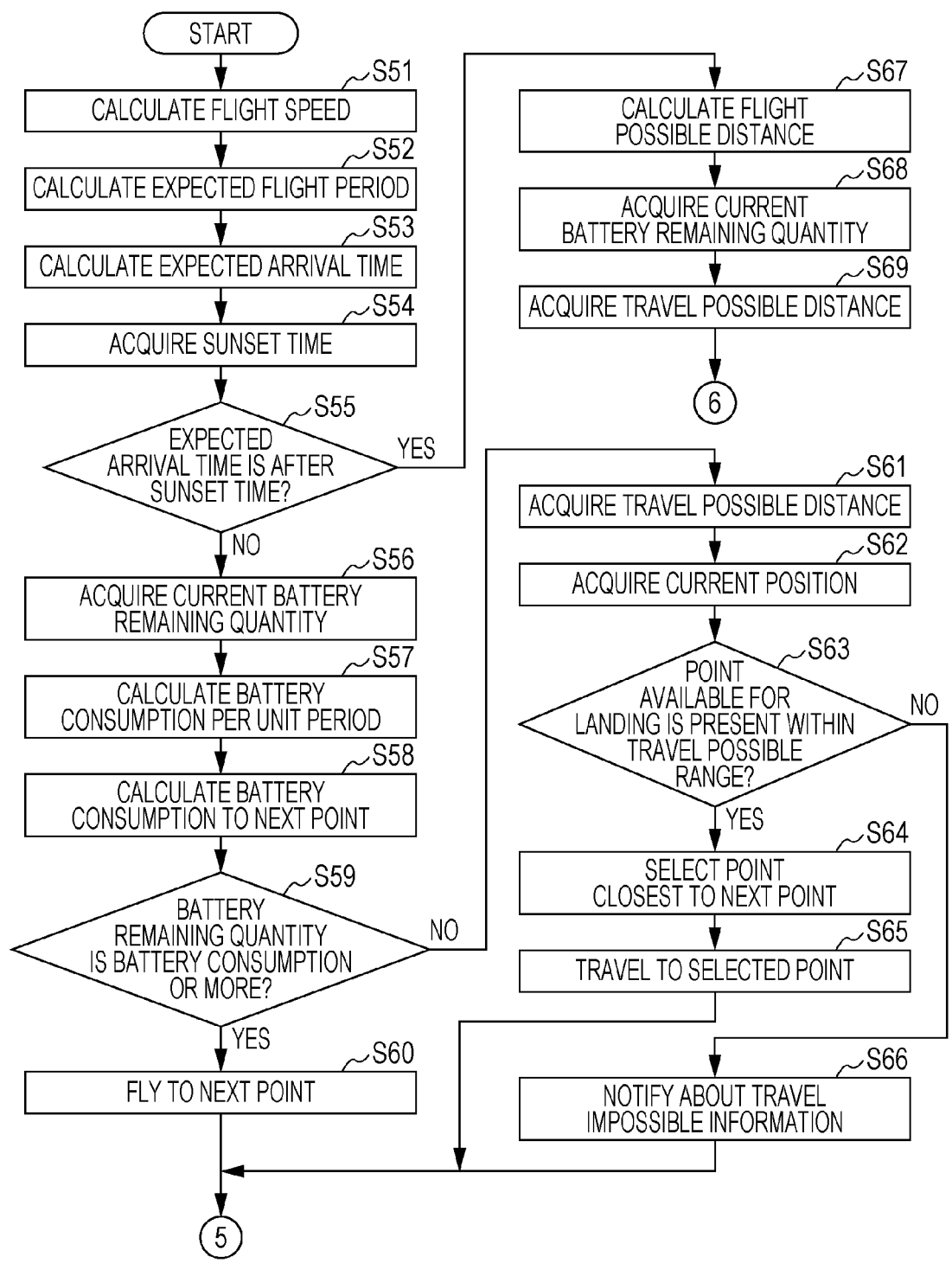
FIG. 13 is a first flowchart for explaining flight control processing on the unmanned flying object according to the third embodiment of the present disclosure.
Figure 14:
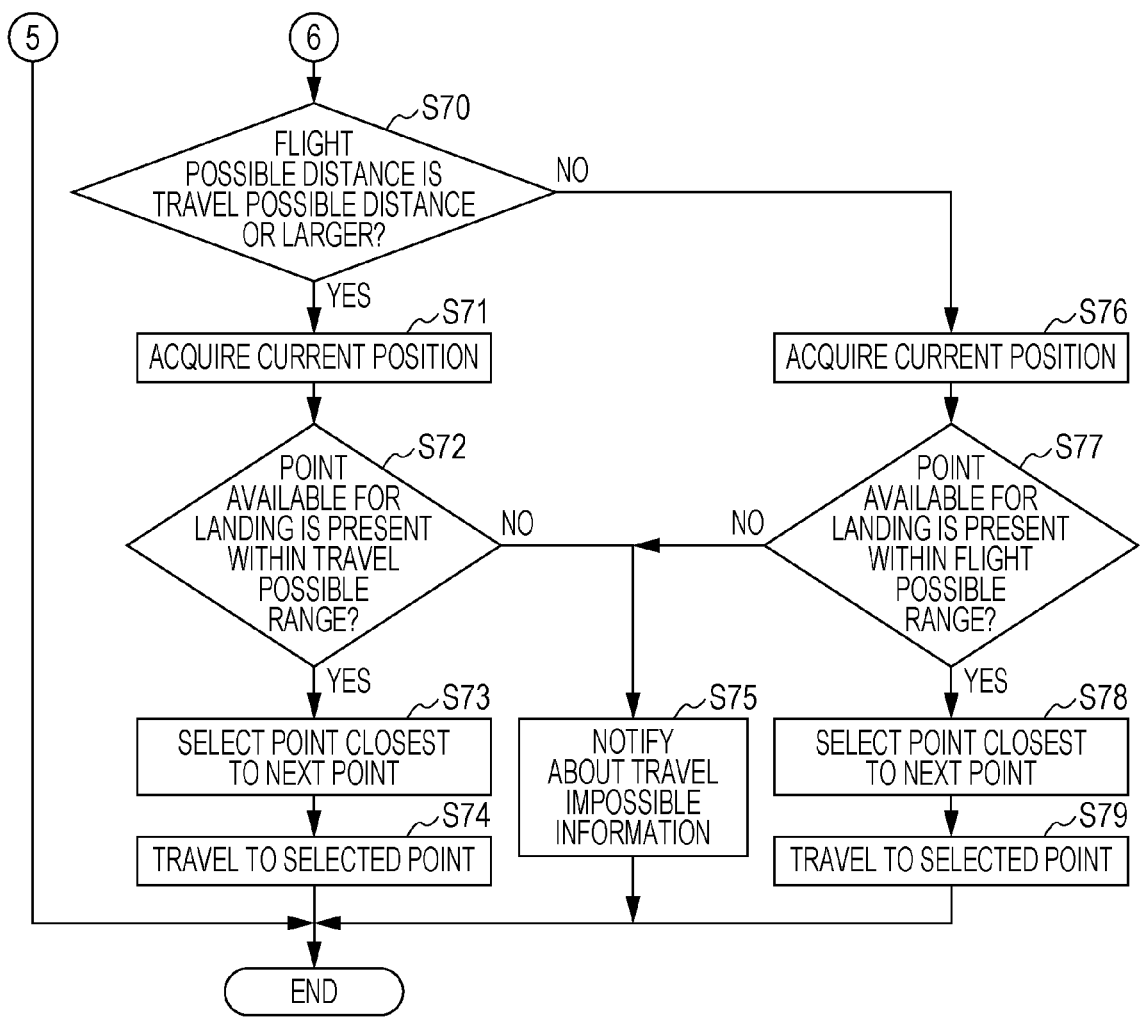
FIG. 14 is a second flowchart for explaining the flight control processing on the unmanned flying object according to the third embodiment of the present disclosure.

FIG. 13 is a first flowchart for explaining the flight control processing on the unmanned flying object 12 according to the third embodiment of the present disclosure. FIG. 14 is a second flowchart for explaining the flight control processing on the unmanned flying object 12 according to the third embodiment of the present disclosure.

First, in step S51, the expected arrival time calculator 113 calculates the flight speed of the unmanned flying object 12 currently in flight. To be specific, the expected arrival time calculator 113 calculates the flight speed by dividing the flight distance of flight from the last departure point to the current position by the period elapsed since the last departure time until the current time. The current position of the unmanned flying object 12 is acquired by the position measurer 102. The last departure point may be stored in the storage 108, or may be calculated by using the current position and the route information 132. The last departure time is stored in the storage 108. The current time is acquired by the timepiece 101.

Then, in step S52, the expected arrival time calculator 113 calculates an expected flight period from the current position to the next point. To be specific, the expected arrival time calculator 113 calculates the expected flight period by dividing the expected flight distance of flight from the current position to the next point by the calculated flight speed.

Then, in step S53, the expected arrival time calculator 113 calculates a time at which the expected flight period elapses since the current time, as the expected arrival time at which the unmanned flying object 12 arrives at the next point.

Then, in step S54, the arrival decider 114 reads out the sunset time information 134 from the storage 108 and acquires the sunset time. The sunset time according to the third embodiment is a sunset time corresponding to the next position.

Then, in step S55, the arrival decider 114 decides whether the expected arrival time is after the sunset time.

If it is decided that the expected arrival time is not after the sunset time (NO in step S55), in step S56, the battery remaining quantity acquirer 112 acquires the current remaining quantity of the battery 106.

Then, in step S57, the point selector 119 calculates a battery consumption per unit period. To be specific, the point selector 119 calculates the battery consumption per unit period by dividing the flight distance of flight from the last departure point to the current point by the difference between the remaining quantity of the battery 106 at the last departure point and the current remaining quantity of the battery 106. The remaining quantity of the battery 106 at the last departure point is acquired by the battery remaining quantity acquirer 112 at the last departure, and is stored in the storage 108.

Then, in step S58, the point selector 119 calculates a battery consumption to be consumed from the current position to arrival at the next point. To be specific, the point selector 119 calculates the battery consumption to be consumed from the current position to arrival at the next point by dividing the expected flight distance of flight from the current position to the next point by the battery consumption per unit period.

Then, in step S59, the point selector 119 decides whether the current battery remaining quantity acquired by the battery remaining quantity acquirer 112 is equal to or more than the battery consumption to be consumed from the current position to arrival at the next point. If it is decided that the battery remaining quantity is equal to or more than the battery consumption (YES in step S59), in step S60, since the unmanned flying object 12 can arrive at the next point by the sunset time with the current battery remaining quantity, the flight controller 111 causes the unmanned flying object 12 to depart for the next point.

In contrast, if it is decided that the battery remaining quantity is less than the battery consumption (NO in step S59), in step S61, the point selector 119 reads out the travel possible distance information 138 from the storage 108, and acquires the travel possible distance corresponding to the acquired current remaining quantity of the battery 106.

Then, in step S62, the point selector 119 acquires the current position of the unmanned flying object 12 measured by the position measurer 102.

Then, in step S63, the point selector 119 decides whether a point available for landing is present within a travel possible range expressed by a circle with a center corresponding to the current position and a radius corresponding to the travel possible distance. That is, the point selector 119 references the way point information 133 stored in the storage 108, and extracts a point present within the travel possible range among a plurality of points to which the unmanned flying object 12 can travel. If it is decided that the point available for landing is present within the travel possible range (YES in step S63), in step S64, the point selector 119 selects at point which is the closest to the next point from at least one point present within the travel possible range.

Then, in step S65, the flight controller 111 causes the unmanned flying objet 12 to travel to the point selected by the point selector 119. The flight controller 111 changes the route to the previously determined next point to the route to the selected point. If the point of the travel target is changed from the next point previously determined by the flight route, the notifier 117 may notify the management terminal 20 about that the unmanned flying object 12 travels to the point different from the next point previously determined by the flight route.

In contrast, if it is decided that the point available for landing is not present within the travel possible range (NO in step S63), in step S66, the notifier 117 notifies the management terminal 20 about travel impossible information representing that the unmanned flying object 12 cannot arrive at the next point with the current battery remaining quantity and there is no point to which the unmanned flying object 12 can travel with the current battery remaining quantity near the current position. At this time, the travel impossible information may include the travel possible range in which the unmanned flying object 12 can travel with the current battery remaining quantity. The management terminal 20 which has received the travel impossible information may transmit landing position information for designating the position at which the unmanned flying object 12 is landed within the travel possible range, to the unmanned flying object 12. If receiving the landing position information, the flight controller 111 may cause the unmanned flying object 12 to land at the position indicated by the received landing position information. The travel impossible information may include a distance by which the unmanned flying object 12 can fly by the sunset time.

In step S55, if it is decided that the expected arrival time is after the sunset time (YES in step S55), in step S67, the point selector 119 calculates the flight possible distance that represents the distance by which the unmanned flying object 12 can fly from the current time until the sunset time. To be specific, the point selector 119 calculates the flight possible distance by multiplying the flight period from the current time to the sunset time by the travel speed.

Then, in step S68, the battery remaining quantity acquirer 112 acquires the current remaining quantity of the battery 106.

Then, in step S69, the point selector 119 reads out the travel possible distance information 138 from the storage 108, and acquires the travel possible distance corresponding to the acquired current remaining quantity of the battery 106.

Then, in step S70, the point selector 119 decides whether the flight possible distance is equal to or larger than the travel possible distance. In this case, if it is decided that the flight possible distance is equal to or larger than the travel possible distance (YES in step S70), in step S71, the point selector 119 acquires the current position of the unmanned flying object 12 measured by the position measurer 102.

Then, in step S72, the point selector 119 decides whether a point available for landing is present within the travel possible range expressed by the circle with the center corresponding to the current position and the radius corresponding to the travel possible distance. That is, the point selector 119 references the way point information 133 stored in the storage 108, and extracts a point present within the travel possible range among a plurality of points to which the unmanned flying object 12 can travel. If it is decided that the point available for landing is present within the travel possible range (YES in step S72), in step S73, the point selector 119 selects a point which is the closest to the next point from at least one point present within the travel possible range.

Then, in step S74, the flight controller 111 causes the unmanned flying objet 12 to travel to the point selected by the point selector 119. The flight controller 111 changes the route to the previously determined next point to the route to the selected point. If the point of the travel target is changed from the next point previously determined by the flight route, the notifier 117 may notify the management terminal 20 about that the unmanned flying object 12 travels to the point different from the next point previously determined by the flight route.

In contrast, if it is decided that the point available for landing is not present within the travel possible range (NO in step S72), in step S75, the notifier 117 notifies the management terminal 20 about travel impossible information representing that the unmanned flying object 12 cannot arrive at the next point by the sunset time and there is no point to which the unmanned flying object 12 can travel with the current battery remaining quantity near the current position. At this time, the travel impossible information may include the travel possible range in which the unmanned flying object 12 can travel with the current battery remaining quantity. The management terminal 20 which has received the travel impossible information may transmit landing position information for designating the position at which the unmanned flying object 12 is landed within the travel possible range, to the unmanned flying object 12. If receiving the landing position information, the flight controller 111 may cause the unmanned flying object 12 to land at the position indicated by the received landing position information. The travel impossible information may include a distance by which the unmanned flying object 12 can fly by the sunset time.

In step S70, if it is decided that the flight possible distance is smaller than the travel possible distance (NO in step S70), in step S76, the point selector 119 acquires the current position of the unmanned flying object 12 measured by the position measurer 102.

Then, in step S72, the point selector 119 decides whether a point available for landing is present within the travel possible range expressed by the circle with the center corresponding to the current position and the radius corresponding to the travel distance. That is, the point selector 119 references the way point information 133 stored in the storage 108, and extracts a point present within the flight possible range among a plurality of points to which the unmanned flying object 12 can travel. If it is decided that the point available for landing is present within the flight possible range (YES in step S77), in step S78, the point selector 119 selects a point which is the closest to the next point from at least one point present within the flight possible range.

Then, in step S79, the flight controller 111 causes the unmanned flying objet 12 to travel to the point selected by the point selector 119. The flight controller 111 changes the route to the previously determined next point to the route to the selected point. If the point of the travel target is changed from the next point previously determined by the flight route, the notifier 117 may notify the management terminal 20 about that the unmanned flying object 12 travels to the point different from the next point previously determined by the flight route.

In contrast, if it is decided that the point available for landing is not present within the flight possible range (NO in step S77), in step S75, the notifier 117 notifies the management terminal 20 about travel impossible information representing that the unmanned flying object 12 cannot arrive at the next point by the sunset time and there is no point to which the unmanned flying object 12 can travel by the sunset time near the current position. The travel impossible information may include a distance by which the unmanned flying object 12 can fly by the sunset time. The management terminal 20 which has received the travel impossible information may transmit landing position information for designating the position at which the unmanned flying object 12 is landed within the flight possible range, to the unmanned flying object 12. If receiving the landing position information, the flight controller 111 may cause the unmanned flying object 12 to land at the position indicated by the received landing position information. The travel impossible information may include the travel possible range in which the unmanned flying object 12 can travel with the current battery remaining quantity.

The flight control processing performed during flight of the unmanned flying object 12 according to the third embodiment is preferably performed every predetermined time interval or every predetermined distance interval.

The point selector 119 selects a point which is the closest to the next point from at least one extracted point in step S64, step S73, and step S78; however, the present disclosure is not limited thereto. The point selector 119 may select a point which is the closest to a final destination point from at least one extracted point. Also, the notifier 117 may notify the management terminal 20 about the at least one extracted point. The management terminal 20 receives selection by a manager of a single point from the at least one extracted point. The point selector 119 may select the point selected by the management terminal 20 as a point of a new travel target.

If it is decided that the expected arrival time is after the sunset time in step S55, or if it is decided that the battery remaining quantity is less than the battery consumption in step S59, that is, if it is decided that the unmanned flying object 12 cannot arrive at the next point (second point), the notifier 117 may notify the management terminal 20 about the travel impossible information representing that the unmanned flying object 12 cannot arrive at the next point (second point). The travel impossible information may include a distance by which the unmanned flying object 12 can fly by the sunset time. The management terminal 20 which has received the travel impossible information may transmit landing position information for designating the position at which the unmanned flying object 12 is landed, to the unmanned flying object 12. If receiving the landing position information, the flight controller 111 may cause the unmanned flying object 12 to land at the position indicated by the received landing position information. The travel impossible information may include the travel possible range in which the unmanned flying object 12 can travel with the current battery remaining quantity.

While the description for the third embodiment is on the flight control processing performed during flight of the unmanned flying object 12, the flight control processing performed when the unmanned flying object 12 arrives at a predetermined point on a predetermined flight route is the same as the flight control processing according to the first embodiment or the second embodiment.

The plurality of points to which the unmanned flying object 12 can travel may include a point through which the unmanned flying object 12 has to pass and a point through which the unmanned flying object 12 does not have to pass. The way point information 133 stored in the storage 108 may include information indicative of that each point is whether a point through which the unmanned flying object 12 has to pass or a point through which the unmanned flying object 12 does not have to pass.

If it is previously determined that the unmanned flying object 12 travels to the fifth point after the second point and lands on the fourth point, the flight controller 111 may decide whether the second point is a point through which the unmanned flying object 12 has to pass. If it is decided that the second point is a point through which the unmanned flying object 12 has to pass, the flight controller 111 may cause the unmanned flying object 12 to depart for the second point from the fourth point. If it is decided that the second point is a point through which the unmanned flying object 12 does not have to pass, the flight controller 111 may cause the unmanned flying object 12 to depart for the fifth point from the fourth point.

For example, in the example illustrated in FIG. 12, if it is previously determined that the unmanned flying object 12 travels to the point G after the point D, and lands on the point B instead of the point D during flight from the point A to the point D, the flight controller 111 may decide whether the point D is a point through which the unmanned flying object 12 has to pass. If it is decided that the point D is a point through which the unmanned flying object 12 has to pass, the flight controller 111 may cause the unmanned flying object 12 to depart for the point D from the point B. If it is decided that the point D is a point through which the unmanned flying object 12 does not have to pass, the flight controller 111 may cause the unmanned flying object 12 to depart for the point G from the point B.

As described above, if the previously determined way point is changed during flight and the point before the change is not a point through which the unmanned flying object 12 has to pass, the route from the point before the change to the next point may be changed to a route from the point after the change to the next point. Also, if the previously determined way point is changed during flight and the point before the change is a point through which the unmanned flying object 12 has to pass, the route from the point after the change to the point before the change may be changed to a route from the point before the change to the next point.

Even if it is decided that the second point is not a point through which the unmanned flying object 12 has to pass, as long as the unmanned flying object 12 cannot directly reach the fifth point from the fourth point, the flight controller 111 may cause the unmanned flying object 12 to depart for the second point from the fourth point.

Even if it is decided that the second point is not a point through which the unmanned flying object 12 has to pass, as long as the unmanned flying object 12 cannot directly reach the fifth point from the fourth point, the flight controller 111 may cause the unmanned flying object 12 to depart for a point which is the closest to the fifth point among points that the unmanned flying object 12 can reach from the fourth point. For example, in the example illustrated in FIG. 12, if it is previously determined that the unmanned flying object 12 travels to the point G after the point D and lands on the point B instead of the point D during flight from the point A to the point D, and if it is decided that the point D is not a point through which the unmanned flying object 12 has to pass, the flight controller 111 may decide whether the unmanned flying object 12 can depart from the point B and arrive at the point G. If it is decided that the unmanned flying object 12 cannot arrive at the point G, the flight controller 111 may select the point E which is at a travel possible distance from the point B and is the closest to the point G. The entire flight route may be updated by executing processing on the selected next way point similarly to the one described above.

Even if it is decided that the second point is not a point through which the unmanned flying object 12 has to pass, as long as the unmanned flying object 12 cannot directly reach the fifth point from the fourth point, the notifier 117 may notify the management terminal 20 about that the unmanned flying object 12 cannot directly reach the fifth point from the fourth point. The management terminal 20 may create a new flight route having a departure point at the fourth point, and may transmit the created new flight route to the unmanned flying object 12. The unmanned flying object 12 may fly on the basis of the received new flight route.

While the unmanned flying object 12 decides whether the unmanned flying object 12 can arrive at the point through which the unmanned flying object 12 passes next, periodically during flight on the basis of the battery remaining quantity and the sunset time, and if the unmanned flying object 12 decides that the unmanned flying object 12 cannot arrive at the next way point, the unmanned flying object 12 selects a new point different from the next way point according to the third embodiment, the present disclosure is not limited thereto. If the unmanned flying object 12 receives an instruction of changing the next way point from the management terminal 20 during flight, the unmanned flying object 12 may decide whether the unmanned flying object 12 can arrive at the instructed next way point, on the basis of the battery remaining quantity and the sunset time. At this time, if the unmanned flying object 12 decides that the unmanned flying object 12 cannot arrive at the instructed next way point, the flight controller 111 causes the unmanned flying object 12 to hover at the current position, and the notifier 117 notifies the management terminal 20 about that the unmanned flying object 12 cannot arrive at the instructed next way point. Also, at the notification, the notifier 117 may make a notification about a point that the unmanned flying object 12 can reach from the current position. If the unmanned flying object 12 cannot make a notification to the management terminal 20 due to abnormal communication or the like, or if the unmanned flying object 12 does not receive a response for the notification from the management terminal 20, the unmanned flying object 12 may automatically select a point at which the unmanned flying object 12 can reach from the current position and which is the closest to the next way point and may travel to the selected point. In this case, the unmanned flying object 12 may automatically select a point at which the unmanned flying object 12 can reach from the current position and which is the closest to the final destination point and may travel to the selected point.

Also, in the third embodiment, the server connected to the unmanned flying object 12 through the network 40 may have the function of the unmanned flying object 12. That is, a controller of the server may include the expected arrival time calculator 113, the arrival decider 114, the expected departure time determiner 115, the notifier 117, and the point selector 119 of the unmanned flying object 12; a storage of the server may include the route information 132, the way point information 133, the sunset time information 134, the sunrise time information 135, the notification target information 136, the travel speed information 137, and the travel possible distance information 138.

In the first embodiment and the second embodiment, if a plurality of unmanned flying objects waits at a predetermined position after the sunset time, and simultaneously departs at the sunrise time, the plurality of unmanned flying objects may collide with one another. Hence, if the plurality of unmanned flying objects waits, the departure times of the unmanned flying objects have to be shifted from one another.

Figure 15:
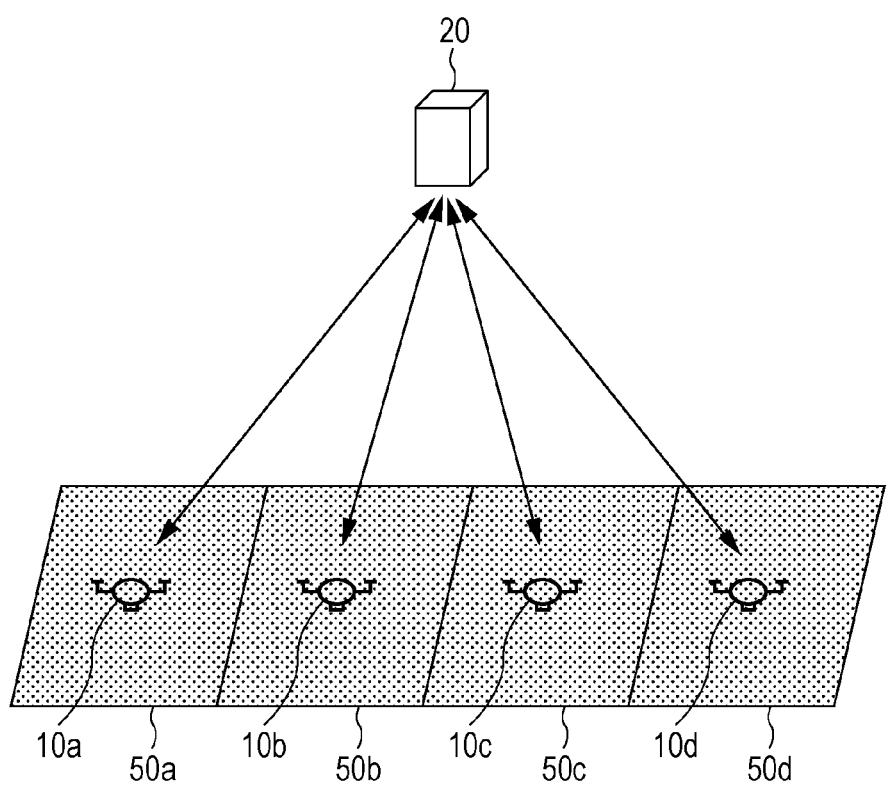
FIG. 15 is a schematic view for explaining a method of determining expected departure times of a plurality of unmanned flying objects.

FIG. 15 is a schematic view for explaining a method of determining expected departure times of a plurality of unmanned flying objects.

A plurality of unmanned flying objects 10*a*, 10*b*, 10*c*, and 10*d* is communicatively connected to the management terminal 20. The plurality of unmanned flying objects 10*a*, 10*b*, 10*c*, and 10*d* waits on charging devices 50*a*, 50*b*, 50*c*, and 50*d*. If it is decided that the expected arrival times are after the sunset time, the notifiers 117 of the plurality of unmanned flying objects 10*a*, 10*b*, 10*c*, and 10*d* may transmit departure standby information for a notification about that the unmanned flying objects 10*a*, 10*b*, 10*c*, and 10*d* wait at the current point, to the management terminal 20. If the management terminal 20 receives the departure standby information from the plurality of unmanned flying objects 10*a*, 10*b*, 10*c*, and 10*d*, the management terminal 20 determines expected departure times shifted from one another by a predetermined period each with respect to the sunrise time in the order of reception, and transmits the determined expected departure times to the plurality of unmanned flying objects 10*a*, 10*b*, 10*c*, and 10*d*. The expected departure time determiners 115 of the plurality of unmanned flying objects 10*a*, 10*b*, 10*c*, and 10*d* store the received expected departure times in the storages 108.

For example, the management terminal 20 may determine the expected departure time of the unmanned flying object 10*a* at 6:00 which is the sunrise time, determine the expected departure time of the unmanned flying object 10*b* at 6:05 set by adding 5 minutes to the sunrise time, determine the expected departure time of the unmanned flying object 10*c* at 6:10 set by adding 10 minutes to the sunrise time, and determine the expected departure time of the unmanned flying object 10*d* at 6:15 set by adding 15 minutes to the sunrise time. In this case, the management terminal 20 determines the expected departure times shifted from one another by 5 minutes each with respect to the sunrise time.

As described above, the expected departure times of the plurality of unmanned flying objects 10*a*, 10*b*, 10*c*, and 10*d* may differ from one another. Accordingly, the plurality of unmanned flying objects 10*a*, 10*b*, 10*c*, and 10*d* can be prevented from departing simultaneously.

Also, if the plurality of unmanned flying objects 10*a*, 10*b*, 10*c*, and 10*d* is communicatively connected to the plurality of charging devices 50*a*, 50*b*, 50*c*, and 50*d*, the plurality of charging devices 50*a*, 50*b*, 50*c*, and 50*d* may transmit delay period information to the unmanned flying objects on charge after the sunset time. The delay period information represents a period to be added to the sunrise time. The plurality of charging devices 50*a*, 50*b*, 50*c*, and 50*d* stores respective different pieces of delay period information. The charging device 50*a* may store delay period information of, for example, 5 minutes; the charging device 50*b* may store delay period information of, for example, 10 minutes; the charging device 50*c* may store delay period information of, for example, 15 minutes; and the charging device 50*d* may store delay period information of, for example, 20 minutes.

In this case, the unmanned flying object 10*a* receives the delay period information from the charging device 50*a*, the expected departure time determiner 115 determines the time set by adding the delay period expressed by the delay period information to the sunrise time, as the expected departure time. For example, if the sunrise time is 6:00 and the delay period is 5 minutes, the expected departure time determiner 115 determines 6:05 as the expected departure time. The expected departure times are determined similarly for the other unmanned flying objects 10*b*, 10*c*, and 10*d*.

The unmanned flying object communicates with the charging device through a wired or wireless feeding medium. The charging device includes a wireless reader, and the unmanned flying object includes a wireless tag. The wireless reader writes delay period information in the wireless tag. Information can be written in a wireless tag, such as a radio frequency identifier (RFID) even when the power of a main body is turned OFF. The unmanned flying object reads out the delay period information written in the wireless tag at restart, and determines the expected departure time. Also, by using the wireless tag, the configuration can be manufactured at lower cost than the cost when a wireless interface, such as a local area network (LAN) is used.

In the present disclosure, the entirety or part of the unit, device, member, or portion, or the entirety or part of the functional blocks in the block diagram illustrated in FIG. 3, 7, or 11 may be executed by one or a plurality of electronic circuits including a semiconductor device, a semiconductor integrated circuit (IC), or a large scale integration (LSI). The LSI or IC may be integrated in a single chip, or may be arranged in a plurality of combined chips. For example, the functional blocks other than a memory element may be integrated in a single chip. In this case, the integrated configuration is called LSI or IC; however, an integrated configuration called system LSI, very large scale integration (VLSI), or ultra large scale integration (ULSI) may be employed. The name is changed depending on the degree of integration. A field programmable gate array (FPGA) that is programmed after LSI is manufactured, or a reconfigurable logic device that allows reconfiguration of joint relationship in LSI or setup for circuit sections in LSI can be used for the same purpose.

Further, a function or operation of the entirety or part of the unit, device, member, or portion may be executed by software processing. In this case, the software is stored in a non-transitory recording medium, such as one or a plurality of ROMs, optical discs, and hard disk drives. When the software is executed by a processor, the function specified by the software is executed by the processor or its peripheral device. A system or apparatus may include one or a plurality of non-transitory recording media storing the software, the processor, and a necessary hardware device, for example, an interface.

The unmanned flying object, flight control method, and recording medium storing the flight control program according to the present disclosure can prevent the unmanned flying object from flying after the end time of the time zone in which the unmanned flying object is permitted to fly, and hence are useful as an unmanned flying object that autonomously flies, a flight control method of controlling the autonomous flight of the unmanned flying object, and a recording medium storing a flight control program of controlling the autonomous flight of the unmanned flight control.

What is claimed is:

1. An autonomous unmanned flying object, comprising:
a controller on the autonomous unmanned flying object and that controls the autonomous unmanned flying object to fly autonomously;
a memory that stores
a time at which sunset occurs, before which the autonomous flying object is permitted to fly and after which the autonomous unmanned flying object is prevented from flying, and
a time at which the next sunrise occurs after which the autonomous flying object is permitted to fly; and
a battery that supplies the autonomous unmanned flying object with electric power,
wherein the controller performs operations including:
acquiring a remaining quantity of the battery;
when the autonomous unmanned flying object starts traveling from a first point at which the autonomous unmanned flying object is currently located to a second point
determining whether the autonomous unmanned flying object will arrive at the second point no later than sunset time, based on the time of sunset and the remaining quantity of the battery, the first point and the second point, being included in a plurality of points previously determined as candidates for way points;
when the controller determines that the autonomous unmanned flying object will arrive at the second point no later than sunset, the controller causes the autonomous unmanned flying object to depart for the second point,
when the controller determines that the autonomous unmanned flying object will arrive at the second point after sunset, the controller prevents the autonomous unmanned flying object from flying to the second point until the time of the next sunrise, after which the autonomous flying object is permitted to fly, and
when the controller determines that the autonomous unmanned flying object will arrive at the second point after sunset, the controller causes the autonomous unmanned flying object to depart at the time of the next sunrise after which the autonomous flying object is permitted to fly.

2. The autonomous unmanned flying object according to claim 1,
wherein a charging device that charges the battery is disposed at the first point, and
wherein the operations further include:
calculating a travel possible distance by which the autonomous unmanned flying object can travel from the first point, on the basis of the remaining quantity of the battery; and
when it is decided that the travel possible distance is not equal to or larger than a travel distance between the first point and the second point, causing the charging device to start charging the battery.

3. The autonomous unmanned flying object according to claim 2,
wherein the operations further include:
acquiring the remaining quantity of the battery while the autonomous unmanned flying object is connected to the charging device;
calculating a travel possible distance by which the autonomous unmanned flying object can travel from the first point, on the basis of the remaining quantity of the battery acquired while the autonomous unmanned flying object is connected to the charging device; and
when it is decided that the calculated travel possible distance is equal to or larger than the travel distance, deciding whether a calculated expected arrival time is after the sunset.

4. The autonomous unmanned flying object according to claim 1, further comprising:
a storage that stores charge availability information indicative of whether a charging device is present at each of the plurality of points,
wherein the operations further include:

calculating a travel possible distance by which the autonomous unmanned flying object can travel from the first point, on the basis of the remaining quantity of the battery;

when it is decided that the travel possible distance is not a travel distance between the first point and the second point, referencing the charge availability information, and deciding whether the charging device is present at the first point; and when it is decided that the charging device is not present at the first point, referencing the charge availability information, specifying a point which is within a range of the travel possible distance, which is within a predetermined range from the first point, and at which the charging device is present, and causing the autonomous unmanned flying object to depart for the specified point.

5. The autonomous unmanned flying object according to claim 1,
wherein the operations further include:
when it is decided that the autonomous unmanned flying object cannot arrive at the second point, determining a start time in which the autonomous unmanned flying object is permitted to fly, as an expected departure time at which the autonomous unmanned flying object is caused to depart for the second point.

6. The autonomous unmanned flying object according to claim 5,
wherein the autonomous unmanned flying object includes a plurality of unmanned flying objects,
wherein the plurality of autonomous unmanned flying objects is present at the first point, and
wherein the plurality of autonomous unmanned flying objects has respective different expected departure times.

7. The autonomous unmanned flying object according to claim 1,
wherein the operations further include:
when it is decided that the autonomous unmanned flying object cannot arrive at the second point, notifying a management terminal that is used by a manager who manages the autonomous unmanned flying object, about that the autonomous unmanned flying object is caused to wait at the first point.

8. The unmanned flying object according to claim 1,
wherein the operations further include:
when it is decided that the autonomous unmanned flying object cannot arrive at the second point, determining a point at which the autonomous unmanned flying object can arrive by sunset, which is within a predetermined range from the second point, and which is the closest to the second point, as a third point through which the autonomous unmanned flying object newly passes; and
causing the autonomous unmanned flying object to depart for the determined third point.

9. The autonomous unmanned flying object according to claim 1, further comprising:
a position measurer that acquires a current position of the autonomous unmanned flying object,
wherein the operations further include:
deciding whether the autonomous unmanned flying object can arrive at the second point during flight from the first point to the second point, on the basis of the current position acquired by the position measurer, the time of sunset before which the autonomous unmanned flying object is permitted to fly, and the remaining quantity of the battery; and
when it is decided that the autonomous unmanned flying object cannot arrive at the second point, causing the autonomous unmanned flying object to travel to a fourth point at which the autonomous unmanned flying object can arrive by sunset, which is within a predetermined range from the second point, and which is the closest to the second point among the plurality of points.

10. The autonomous unmanned flying object according to claim 9,
wherein the operations further include:
when it is previously determined that the autonomous unmanned flying object travels to a fifth point among the plurality of points next to the second point, and if the autonomous unmanned flying object lands on the fourth point,
deciding whether the second point is a point through which the autonomous unmanned flying object has to pass;
when it is decided that the second point is the point through which the autonomous unmanned flying object has to pass, causing the unmanned flying object to depart for the second point from the fourth point; and
when it is decided that the second point is a point through which the autonomous unmanned flying object does not have to pass, causing the autonomous unmanned flying object to depart for the fifth point from the fourth point.

11. An autonomous unmanned flying object according to claim 1, wherein when it is determined that the autonomous unmanned flying object will arrive at the second point later than sunset time, causing the autonomous unmanned flying object to refrain from departing for the second point.

12. An autonomous unmanned flying object according to claim 1, wherein even when it is determined that the remaining quantity of the battery has sufficient power to permit the autonomous unmanned flying object to reach the second point, the autonomous unmanned flying object refrains from departing for the second point when it is determined that the autonomous unmanned flying object will arrive at the second point later than sunset.

13. An autonomous unmanned flying object according to claim 1, wherein
when it is determined that the autonomous unmanned flying object will arrive at the second point before sunset, the controller causing the autonomous unmanned flying object to depart for the second point, and
even when it is determined that the remaining quantity of the battery has sufficient power to permit the autonomous unmanned flying object to reach the second point, the controller causes the autonomous unmanned flying object to refrain from departing for the second point when it is determined that the autonomous unmanned flying object will arrive at the second point after sunset and the controller determines a start time, after the next sunrise, for the autonomous unmanned flying object to depart.

14. An autonomous unmanned flying object according to claim 1, wherein
when it is determined that the autonomous unmanned flying object will arrive at the second point before sunset, the controller causing the autonomous unmanned flying object to depart for the second point, and even when it is determined that the remaining quantity of the battery has sufficient power to permit the autonomous unmanned flying object to reach the second point, the controller causes the autonomous unmanned flying object to refrain from departing for the second point on the current day and causes the autonomous unmanned flying object to depart for the second point on the next day after sunrise on the next day when it is determined that the autonomous unmanned flying object will arrive at the second point on the current day after sunset.

15. The autonomous unmanned flying object according to claim 1, when the controller determines that the autonomous unmanned flying object will arrive at the second point after sunset, the controller also selects a candidate point closer to the first point than the second point, determines whether the expected arrival time at the selected candidate point is after sunset, when the expected arrival time at the selected candidate point is before sunset, the controller causes the autonomous unmanned flying object to depart for the selected candidate point, when the expected arrival time at the selected candidate point is after sunset, the controller selects other candidate points for determining whether the expected arrival time of any of the other candidate points is before sunset, and when the controller determines that the expected arrival time of all of the other candidate points is after sunset, the controller causes the autonomous unmanned flying object to depart after the next sunrise after which the autonomous flying object is permitted to fly.

16. A method of controlling autonomous flight of an autonomous unmanned flying object, comprising:

controlling the autonomous unmanned flying object to fly autonomously, the autonomous unmanned flying object having a memory that stores a time at which sunset occurs, before which the autonomous flying object is permitted to fly and after which the autonomous unmanned flying object is prevented from flying, and a time at which the next sunrise occurs after which the autonomous flying object is permitted to fly acquiring a remaining quantity of a battery that supplies the autonomous unmanned flying object with electric power;

when the autonomous unmanned flying object starts traveling from a first point at which the autonomous unmanned flying object is currently located to a second point, determining whether the autonomous unmanned flying object will arrive at the second point no later than sunset, based on the time of sunset and the remaining quantity of the battery, the first point and the second point, being included in a plurality of points previously determined as candidates for way points;

when it is determined that the autonomous unmanned flying object will arrive at the second point no later than sunset, causing the autonomous unmanned flying object to depart for the second point;

when the controller determines that the autonomous unmanned flying object will arrive at the second point after sunset, the controller prevents the autonomous unmanned flying object from flying to the second point until the time of the next sunrise, after which the autonomous flying object is permitted to fly, and when the controller determines that the autonomous unmanned flying object will arrive at the second point after sunset, the controller causes the autonomous unmanned flying object to depart after the next sunrise, after which the autonomous flying object is permitted to fly.

17. A non-transitory computer-readable recording medium storing a program of controlling autonomous flight of an autonomous unmanned flying object, wherein, when the program is executed by a computer, the program causes the computer to perform operations including:

controlling the autonomous unmanned flying object to fly autonomously, the autonomous unmanned flying object having a memory that stores a time at which sunset occurs before which the autonomous flying object is permitted to fly and after which the autonomous unmanned flying object is prevented from flying, and a time at which the next sunrise occurs after which the autonomous flying object is permitted to fly acquiring a remaining quantity of a battery that supplies the autonomous unmanned flying object with electric power;

when the autonomous unmanned flying object starts traveling from a first point at which the autonomous unmanned flying object is currently located to a second point, determining whether the autonomous unmanned flying object will arrive at the second point no later than sunset, based on the time of sunset and the remaining quantity of the battery, the first point and the second point, being included in a plurality of points previously determined as candidates for way points;

when it is determined that the autonomous unmanned flying object will arrive at the second point no later than sunset, causing the autonomous unmanned flying object to depart for the second point, when the controller determines that the autonomous unmanned flying object will arrive at the second point after sunset, the controller prevents the autonomous unmanned flying object from flying to the second point until the time of the next sunrise, after which the autonomous flying object is permitted to fly, and when the controller determines that the autonomous unmanned flying object will arrive at the second point after sunset, the controller causes the autonomous unmanned flying object to depart after the next sunrise, after which the autonomous flying object is permitted to fly.

* * * * *